(12) United States Patent
Khoche et al.

(10) Patent No.: US 12,001,993 B2
(45) Date of Patent: Jun. 4, 2024

(54) SYSTEM AND METHODS OF ELECTRONICS SAMPLING TO OPTIMIZE SYSTEM PERFORMANCE, COST, AND CONFIDENCE LEVELS

(71) Applicant: TRACKONOMY SYSTEMS, INC., San Jose, CA (US)

(72) Inventors: Ajay Khoche, West San Jose, CA (US); Hendrik J. Volkerink, Palo Alto, CA (US)

(*) Notice: Subject to any disclaimer, the term of this patent is extended or adjusted under 35 U.S.C. 154(b) by 313 days.

(21) Appl. No.: 17/390,786

(22) Filed: Jul. 30, 2021

(65) Prior Publication Data

US 2022/0036300 A1 Feb. 3, 2022

Related U.S. Application Data

(60) Provisional application No. 63/087,320, filed on Oct. 5, 2020, provisional application No. 63/059,957, filed on Jul. 31, 2020.

(51) Int. Cl.
*G06Q 10/0833* (2023.01)
*G06K 19/077* (2006.01)
*H04W 4/029* (2018.01)
*H04W 84/18* (2009.01)
*G06Q 10/08* (2023.01)

(52) U.S. Cl.
CPC ..... *G06Q 10/0833* (2013.01); *G06K 19/0776* (2013.01); *H04W 4/029* (2018.02); *H04W 84/18* (2013.01); *G06Q 10/08* (2013.01)

(58) Field of Classification Search
USPC ........ 340/572.8, 538.13, 539.22, 545.3, 562, 340/572.1–572.7, 588, 602, 660, 825.22, 340/10.52, 310.14
See application file for complete search history.

(56) References Cited

U.S. PATENT DOCUMENTS

| | | | |
|---|---|---|---|
| 7,048,194 B2 | 5/2006 | Minami et al. |
| 7,177,054 B2 | 2/2007 | Silverbrook et al. |
| 7,299,990 B2 | 11/2007 | Hoshina |
| 7,540,603 B2 | 6/2009 | Otsuki |
| 8,062,735 B2 | 11/2011 | Bi et al. |
| 8,072,620 B2 | 12/2011 | Yamamoto et al. |
| 8,292,173 B2 | 10/2012 | Yturralde et al. |
| 9,643,460 B2 | 5/2017 | Peine et al. |
| 2010/0096181 A1 | 4/2010 | Nakamura et al. |
| 2012/0271540 A1 | 10/2012 | Miksa et al. |
| 2013/0131980 A1 | 5/2013 | Ginsberg |

(Continued)

FOREIGN PATENT DOCUMENTS

JP 2008239282 10/2008

OTHER PUBLICATIONS

International Application No. PCT/US2018/064919, International Search Report and Written Opinion, dated Apr. 5, 2019, 10 pages.

(Continued)

*Primary Examiner* — Daniel Previl

(57) ABSTRACT

An IoT sampling system that includes a set of adhesive tape platforms. Each adhesive tape platform has zero or more wireless transducing circuits applied according to a sampling frequency that is based on a predetermined criteria. Each applied wireless transducing circuit further having a predetermined role and on one or more features based on the predetermined criteria.

25 Claims, 10 Drawing Sheets

(56) References Cited

U.S. PATENT DOCUMENTS

| | | | |
|---|---|---|---|
| 2013/0250357 A1 | 9/2013 | Yu | |
| 2013/0304401 A1* | 11/2013 | Tubaro | A63B 22/0285 |
| | | | 702/41 |
| 2015/0324745 A1 | 11/2015 | Goodall et al. | |
| 2015/0349667 A1 | 12/2015 | Andosca et al. | |
| 2016/0011074 A1 | 1/2016 | Mian et al. | |
| 2016/0026213 A1* | 1/2016 | Li | G06F 1/163 |
| | | | 361/679.03 |
| 2016/0262670 A1* | 9/2016 | Wasson | A61B 5/0033 |
| 2017/0079144 A1 | 3/2017 | Coleman et al. | |
| 2017/0230348 A1* | 8/2017 | Bak | H04L 63/08 |
| 2018/0003507 A1 | 1/2018 | Arslan et al. | |
| 2018/0165568 A1* | 6/2018 | Khoche | B32B 37/06 |
| 2018/0167783 A1 | 6/2018 | Khoche | |
| 2019/0370624 A1* | 12/2019 | Khoche | H04W 4/80 |
| 2020/0111343 A1* | 4/2020 | Krejcarek | H04W 4/80 |
| 2021/0141838 A1* | 5/2021 | Atallah | G06F 16/9577 |
| 2021/0150302 A1 | 5/2021 | Khoch | |
| 2021/0200826 A1* | 7/2021 | Schuler | G06F 16/43 |

OTHER PUBLICATIONS

International Application No. PCT/US2021/044078, International Search Report and Written Opinion dated Oct. 26, 2021 17 pages.

\* cited by examiner

SYSTEM AND METHODS OF ELECTRONICS SAMPLING TO OPTIMIZE SYSTEM PERFORMANCE, COST, AND CONFIDENCE LEVELS

RELATED APPLICATIONS

This application claims priority to U.S. Patent Application Ser. No. 63/059,957, titled "SYSTEM AND METHODS OF ELECTRONICS SAMPLING TO OPTIMIZE SYSTEM PERFORMANCE, COST, AND CONFIDENCE LEVELS", filed Jul. 31, 2020, and incorporated herein by reference.

FIELD OF THE DISCLOSURE

The disclosure generally relates in part to wireless communications networks for industrial internet-of-things (IoT) and more particularly to asset management, including tracking, warehousing, inventorying, and monitoring items, objects, storage containers, and safety devices.

BACKGROUND

Embodiments disclosed herein generally relate to system and methods of electronics sampling to optimize system performance, cost, and confidence levels by balancing dynamic and stationary configurations.

Wireless node networks traditionally are implemented as centralized or tree-based network topologies in which a small set of nodes are directly linked to each other hierarchically. Star and tree topologies are non-linear data structures that organize objects hierarchically. These topologies consist of a collection of nodes that are connected by edges, where each node contains a value or data, and each node may or may not have a child node. Oftentimes, the nodes of a wireless sensor network are organized hierarchically according to the roles and attributes of the nodes (e.g., communications range, battery life, processor clock rate, etc.). For example, the nodes of a wireless-sensor network may be organized as a hierarchical tree structure with one or more short range, low-power child nodes populating the bottom level of the tree structure, and a high-power master node at a higher level of the tree structure to manage the child nodes.

SUMMARY

An IoT An IoT sampling system that includes a set of adhesive tape platforms. Each adhesive tape platform has zero or more wireless transducing circuits applied according to a sampling frequency that is based on a predetermined criteria. Each applied wireless transducing circuit further has a predetermined role and on one or more features based on the predetermined criteria.

A method that includes an IoT sampling system determining, based on a predetermined criteria, a sampling rate for distributing wireless transducing circuits per one or more platforms of a set of adhesive tape platforms. The method further includes the IoT sampling system applying, based on the determined sampling rate, the wireless transducing circuits to one or more platforms of the set of adhesive tape platforms, each platform having zero or more wireless transducing circuits. The method further includes the IoT sampling system activating the applied wireless transducing circuits. The method further includes the IoT sampling system instructing the wireless transducing circuits to perform a predetermined role. The method further includes the IoT sampling system receiving data collected from the wireless transducing circuits.

A non-transitory computer readable storage medium, storing a computer instruction, wherein the computer instruction, when executed by a computer, causes the computer to perform operations, comprising an IoT sampling system determining, based on a predetermined criteria, a sampling rate for distributing wireless transducing circuits per one or more platforms of a set of adhesive tape platforms. The operations further include the IoT sampling system applying, based on the determined sampling rate, the wireless transducing circuits to one or more platforms of the set of adhesive tape platforms, each platform having zero or more wireless transducing circuits. The operations further include the IoT sampling system activating the applied wireless transducing circuits. The operations further include the IoT sampling system instructing the wireless transducing circuits to perform a predetermined role. The operations further include the IoT sampling system receiving data collected from the wireless transducing circuits.

DETAILED DESCRIPTION OF THE EMBODIMENTS

Figure 1:
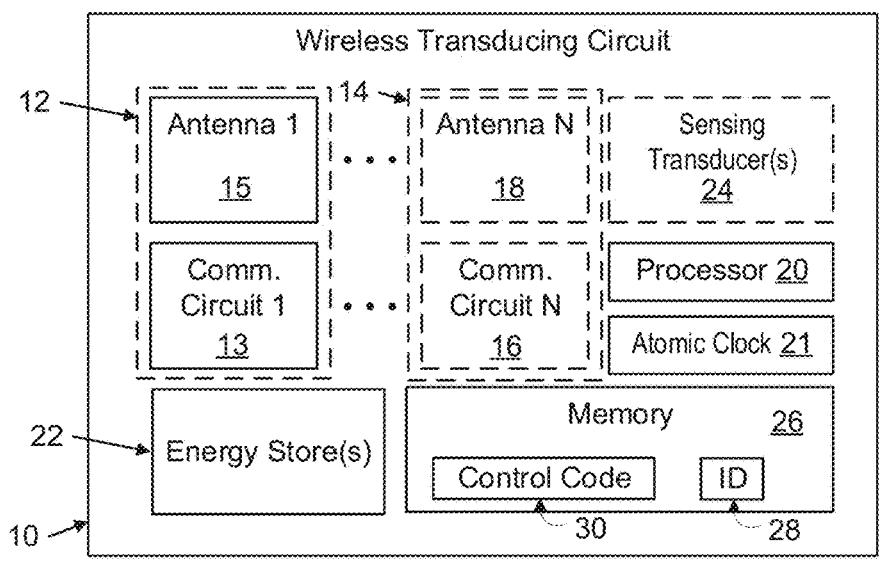
FIG. 1 is a schematic view of an example wireless transducing circuit, according to an embodiment.

The present disclosure is not limited in any way to the illustrated embodiments. Instead, the illustrated embodiments described below are merely examples of the disclosure. Therefore, the structural and functional details disclosed herein are not to be construed as limiting the claims. The disclosure merely provides bases for the claims and representative examples that enable one skilled in the art to make and use the claimed disclosures. Furthermore, the terms and phrases used herein are intended to provide a comprehensible description of the disclosure without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The term "data object" refers to an addressable data file or a subset thereof.

The term "metadata" include information about data objects or characteristics thereof.

The terms "module," "manager," and "unit" refer to hardware, software, or firmware, or a combination thereof.

As used herein, the term "or" refers an inclusive "or" rather than an exclusive "or." In addition, the articles "a" and "an" as used in the specification and claims mean "one or more" unless specified otherwise or clear from the context to refer the singular form.

In some contexts, the term "platform" may refer to an adhesive tape with a wireless transducing circuit embedded within, as discussed at least in FIGS. 1-4C. The term "dummy platform" may be used to refer to an adhesive tape platform without an embedded wireless transducing circuit or an embedded sensor. For brevity, the terms "platform", "tape platform", or "adhesive tape platform" may also be used interchangeably with each other, and with "tape agent", "tape node", "agent", "node", "intelligent node", any variant thereof that relates to an adhesive platform that includes a wireless transducing circuit, with or without embedded sensors, etc.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent", an agent with a medium-power wireless communication-interface may be referred to a "secondary agent", and an agent with a high-power wireless communication-interface may be referred to a "tertiary agent". In some examples, a secondary agent may also include a low-power wireless-communication interface and a tertiary agent may also include low and medium-power wireless-communication interfaces, as discussed below with reference to FIG. 4A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent. Further, the "master tape node" may control a "secondary tape node" and a "tertiary tape node", regardless of whether the master tape node is a parent node.

Further, each of the "tape nodes" or "tape agents" may be referred to as "intelligent nodes", "intelligent tape nodes", or "intelligent tape agents" or any variant thereof, depending on the context and, for ease, may be used interchangeably.

In certain contexts, the terms "parcel," "envelope," "box," "package," "container," "pallet," "carton," "wrapping," and the like are used interchangeably herein to refer to a packaged item or items.

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. Applications may represent one or more of event detection applications, monitoring applications, security applications, notification applications, and tracking applications, including inventory tracking, package tracking, person tracking, animal (e.g., pet) tracking, manufactured parts tracking, and vehicle tracking. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server (e.g., server 1004) or other computer system (e.g., computing system 320) directly or through a network (e.g., network 952 or network 1000) (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

In addition to creating a low-cost method of tracking items utilizing an adhesive surface, embodiments of the present disclosure reduce costs even further by lowering the number of tape agents attached to packages according to a sampling rate, while retaining the necessary information, such as environmental data, from the tape agents.

FIG. 1 shows a block diagram of the components of an example wireless transducing circuit 10 (e.g., a tape node) that includes one or more wireless communication modules 12, 14. Each communication module 12, 14 includes a wireless communication circuit 13, 16, and an antenna 15, 18, respectively. Each communication circuit 13, 16 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 10 also includes a processor 20 (e.g., a microcontroller or microprocessor), a solid-state atomic clock 21, at least one energy store 22 (e.g., non-rechargeable or rechargeable printed flexible battery, conventional single or multiple cell battery, and/or a super capacitor or charge pump), one or more sensing transducers 24 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 10.

Sensing transducers 24 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 10 includes a memory 26 for storing data, such as profile data, state data, event data, sensor data, localization data, security data, and/or at least one unique identifier (ID) 28 associated with the wireless transducing circuit 10, such as one or more of a product ID, a type ID, and a media access control (MAC) ID. Memory 26 may also store control code 30 that includes machine-readable instructions that, when executed by the processor 20, cause processor 20 to perform one or more autonomous agent tasks. In certain embodiments, the memory 26 is incorporated into one or more of the processor 20 or sensing transducers 24. In other embodiments, memory 26 is integrated in the wireless transducing circuit 10 as shown in FIG. 1. The control code 30 may implement programmatic functions or program modules that control operation of the wireless transducing circuit 10, including implementation of an agent communication manager that manages the manner and timing of tape agent communications, a node power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 10. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 2:
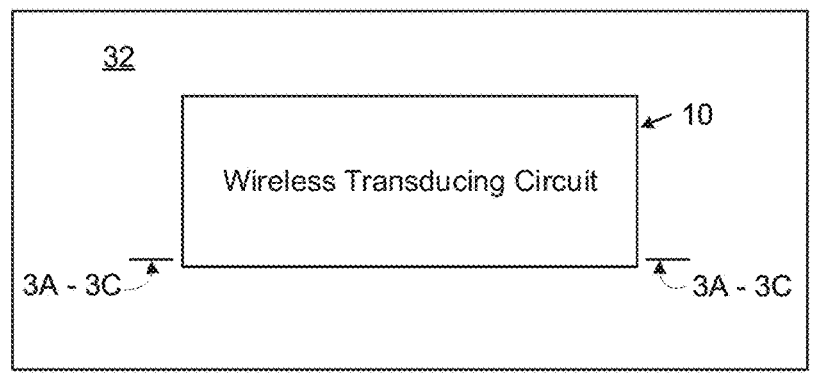
FIG. 2 is a diagrammatic top view of a platform containing an embedded wireless transducing circuit, according to an embodiment.

FIG. 2 is a top view of a generic platform 32 for the wireless transducing circuit 10. In some embodiments, multiple platforms 32 may each contain respective sets of components that are identical and configured in the same way. In other embodiments, multiple platforms 32 may each contain respective sets of components that differ and/or are configured in different ways. For example, different ones of the platforms 32 have different sets or configurations of tracking and/or transducing components that are designed and/or optimized for different applications. Also, or alternatively, different sets of segments of the platform 32 may have different ornamentations (e.g., markings on the exterior surface of the platform) and/or different dimensions.

An example method of fabricating the platform 32 (with reference to FIG. 2) uses to a roll-to-roll fabrication process as described in connection with FIGS. 6, 7A, and 7B of U.S. patent application Ser. No. 15/842,861, filed Dec. 14, 2017, the entirety of which is incorporated herein by reference.

In some embodiments, the generic platform 32 for the wireless transducing circuit 10 may be in the form of a cube, cuboid, cylinder, cone, triangular shaped prism, or any three-dimensional shape, of any dimension, that can include the wireless transducing circuits, as described herein, with reference to FIGS. 3A-C. For example, the generic platform 32 may be any form factor. For example, the generic platform 32 may be in the form of a cube with sides surrounding the wireless transducing circuit 10 and any sensors or wireless-communication interfaces. In some embodiments, the wireless transducing circuit 10 is embedded within the sides of the three-dimensional shape platform. In some embodiments, the three-dimensional shaped platform is not applied to a package but is configured to plug into an outlet to be used as a permanent power source. In some embodiments, the platform 32 is a sturdy, non-flexible material, in the form of a mailing label, that may be applied to flat surfaces, such as the side of the package 110. In the embodiments of the two and three-dimensional platforms, any of the segments 40, 70, or 80 (FIGS. 4A-C, respectively) are included in, or integrated into the sides of, the two or three-dimensional platforms.

The instant specification describes an example system of tape agents (also referred to herein as "tapes") that can be used to implement a low-cost wireless network infrastructure for performing monitoring, tracking, and other industrial internet-of-things (IOT) functions relating to, for example, parcels, persons, tools, equipment and other physical assets and objects. The example system includes a set of three different types of tape agents that have different respective functionalities and different respective cover markings that visually distinguish the different tape agent types from one another. Other systems may include fewer than three or more than three different types of tape nodes. In one non-limiting example, the covers of the different tape agent types are marked with different colors (e.g., white, green, and black). In the illustrated examples, the different tape agent types also are distinguishable from one another by their respective wireless communications capabilities and their respective sensing capabilities. In some embodiments, the markings may be another form of differentiation (such as numbering, names, etc.) than different colors. The markings may also indicate what kind of electronics the tape node includes (e.g., a dummy tape node without any electronics; a tape node with a low, medium, or high-powered wireless-communication interface; a tape node with a wireless-communication interface and a certain type(s) of sensor; etc.).

Figure 3:
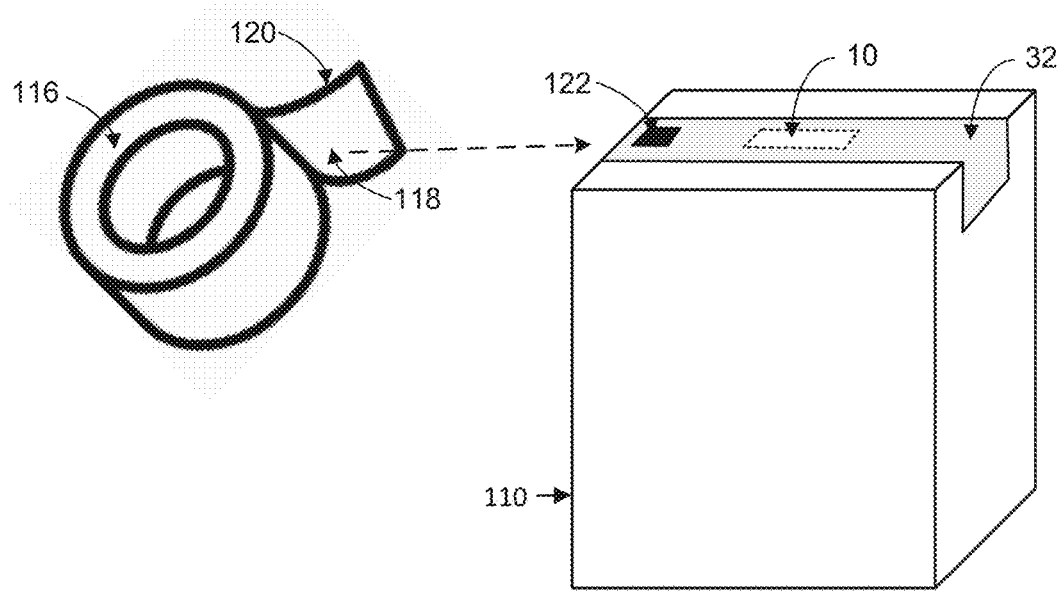
FIG. 3 is a is a diagrammatic view of a segment of an example adhesive tape platform dispensed from a roll used to detect tampering of an asset, according to an embodiment.

FIG. 3 shows an example adhesive tape-agent platform 32, including wireless transducing circuit 10, used to seal a package 110 for shipment. In this example, the platform 32 is dispensed from a roll 116 and affixed to the package 110. The adhesive platform 32 includes an adhesive side 118 and a non-adhesive surface 120. The adhesive platform 32 may be dispensed from the roll 116 in the same way as any conventional packing tape, shipping tape, or duct tape. For example, the adhesive platform 32 may be dispensed from the roll 116 by hand, laid across the seam where the two top flaps of the package 110 meet, and cut to a suitable length either by hand or using a cutting instrument (e.g., scissors or an automated or manual tape dispenser). In some embodiments, the adhesive platform may be dispensed from a sheet that includes cutouts defining a perimeter of each of the adhesive platforms 32, is in the form of a continuous strip of adhesive platform 32 where each adhesive platform is included in a segment of the strip, or any material capable of holding one or more adhesive platforms 32, such as the two or three-dimensional platforms, as discussed with reference to FIGS. 2 and 3. In some embodiments, the adhesive platforms 32 may be packaged in a stack of single platforms. Examples of such tape agents include tape agents having non-adhesive surface 120 that carry one or more coatings or layers (e.g., colored, light reflective, light absorbing, and/or light emitting coatings or layers). Further, the platform 32 may include an identifier 122 (e.g., a QR code, RFID chip, etc.) that may be used to associate the platform 32 with the package 110, as discussed below.

In embodiments, each platform 32 within a roll 116 may include the same identifier 122, which may be used by a network (e.g., network 1000, network 952, etc.) to categorize each platform 32 within the roll 116 within a database (e.g., database 1001). Further, each platform 32 within the roll 116 may include substantially similar features (e.g., temperature sensors, vibration sensors, humidity sensors, a same type of wireless-communication interface, etc.) or may be deployed according to a similar application, such as collecting a same or similar type of environmental data or communication capabilities (e.g., communicating with nearby wireless transducing circuits and/or a satellite 960, 1070). For example, each platform 32 may include all of a temperature sensor, a vibration sensor, an antenna or a similar wireless-communications interface, etc. Each platform 32 may be categorized according to an application, e.g., each platform 32 within the roll 116 may be used to determine a temperature within a facility. To reduce cost, some platforms may have temperature sensors and a communications interface; some platforms 32 may be able to collect temperature data in an area proximate to another platform 32 that does not have a temperature sensor but does have a wireless-communication interface. This way, the network may request a temperature reading from the platform 32 without a temperature sensor, and the platform 32 can request temperature data from the platform 32 with a temperature sensor.

In some embodiments, a roll 116 may be customizable. For example, customized rolls may be prefabricated according to a smart vendor system, where a client application (e.g., the client application 966, 1022) receives a predetermined criteria (such as shipping route data, type of environmental data for collection, a confidence level of having a wireless transducing circuit in a location capable of collecting the inputted environmental data, etc.) and then a customized roll is produced based on the received criteria. In some embodiments, the customized roll may be produced at a shipping facility (e.g., shipping facility) or at a remote location. For example, an authenticated user (e.g., the authenticated user 622) may input their desired predetermined criteria to a client application, for a customized roll to be produced. In some embodiments, the roll may be a standard roll with a set number of wireless transducing circuits applied to platforms 32 of a roll 116.

In some embodiments, as discussed above with reference to FIG. 2, the generic platform 32 for the wireless transducing circuit 10 is not in the form of an adhesive, flexible platform but in the form of a three-dimensional shape, of any dimension, that can include the wireless transducing circuits, as described herein, with reference to FIGS. 3A-C. For example, the generic platform 32 does not come from the roll 116 but in the form of a single stack of platforms 32 and comprises a non-flexible platform that can be applied to the side of the package 110. In some embodiments, the three-dimensional shaped platform is not applied to a package but is configured to plug into an outlet to be used as a permanent power source and is configured to include a wireless transducing circuit 10 with any of a low, medium, or high-powered wireless transducing circuit and/or sensor (e.g., temperature sensor, vibration sensor, humidity sensor, etc.).

Figure 4A:
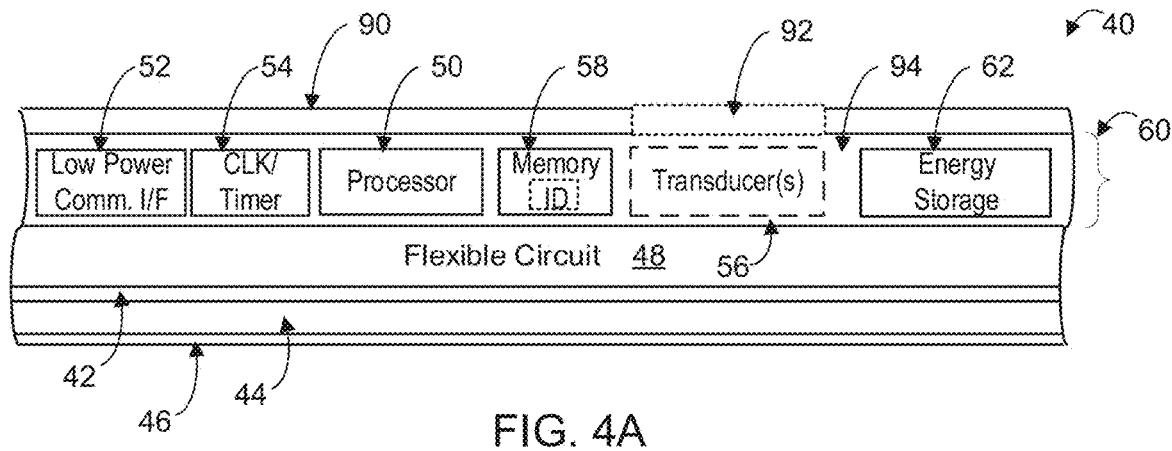
FIGS. 4A-4C show diagrammatic cross-sectional side views of portions of different respective agents, according to various embodiments.

FIG. 4A shows a cross-sectional side view of a portion of an example segment 40 of a flexible adhesive tape agent platform (e.g., platform 32, FIG. 2, 3) that includes a respective set of the components of the wireless transducing circuit 10 corresponding to the first tape-agent type (e.g., white). The segment 40 includes an adhesive layer 42, an optional flexible substrate 44, and an optional adhesive layer 46 on the bottom surface of the flexible substrate 44. When the bottom adhesive layer 46 is present, a release liner (not shown) may be (weakly) adhered to the bottom surface of the adhesive layer 46. In certain embodiments where adhesive layer 46 is included, the adhesive layer 46 is an adhesive (e.g., an acrylic foam adhesive) with a high-bond strength that is sufficient to prevent removal of the segment 40 from a surface on which the adhesive layer 46 is adhered to without destroying the physical or mechanical integrity of the segment 40 and/or one or more of its constituent components. In certain embodiments including the optional flexible substrate 44, the optional flexible substrate 44 is a prefabricated adhesive tape that includes the adhesive layers 42 and 46 and the optional release liner. In other embodiments including the optional flexible substrate 44, the adhesive layers 42, 46 are applied to the top and bottom surfaces of the flexible substrate 44 during the fabrication of the adhesive tape platform. The adhesive layer 42 may bond the flexible substrate 44 to a bottom surface of a flexible circuit 48, that includes one or more wiring layers (not shown) that connect the processor 50, a low-power wireless-communication interface 52 (e.g., a Zigbee, Bluetooth® Low Energy (BLE) interface, or other low power communication interface), a clock and/or a timer circuit 54, transducing and/or transducer(s) 56 (if present), the memory 58, and other components in a device layer 60 to each other and to the energy storage device 62 and, thereby, enable the transducing, tracking and other functionalities of the segment 40. The low-power wireless-communication interface 52 typically includes one or more of the antennas 15, 18 and one or more of the wireless communication circuits 13, 16. The segment 40 may further include a flexible cover 90, an interfacial region 92, and a flexible polymer layer 94.

Figure 4B:
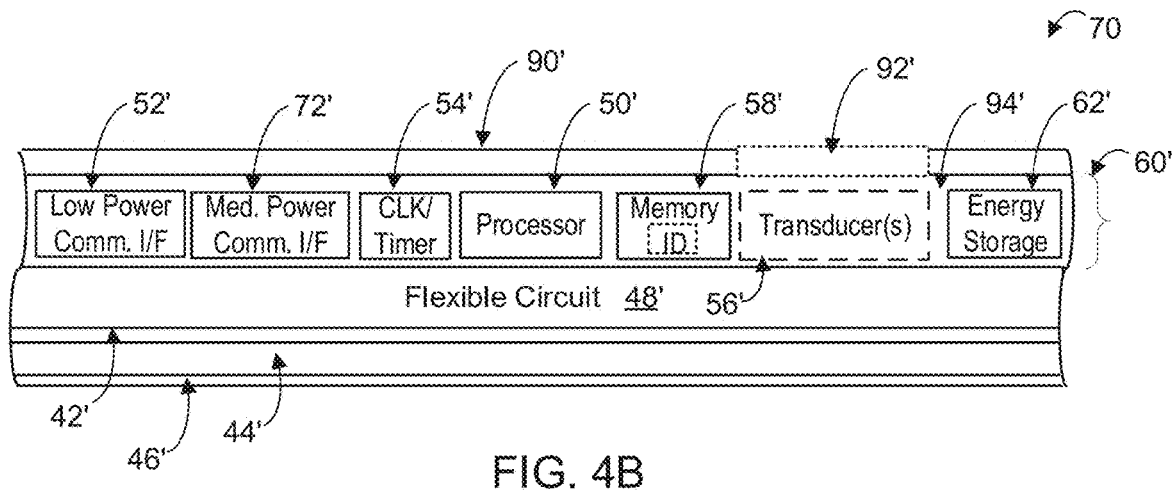

FIG. 4B shows a cross-sectional side-view of a portion of an example segment 70 of a flexible adhesive tape agent platform (e.g., platform 32 of FIG. 2, 3) that includes a respective set of the components of the wireless transducing circuit 10 corresponding to a second tape-agent type (e.g., green). The segment 70 is similar to the segment 40 shown in FIG. 4A but further includes a medium-power communication-interface 72' (e.g., a LoRa interface) in addition to the low-power communications-interface 52. The medium-power communication-interface 72' has a longer communication range than the low-power communication-interface 52'. In certain embodiments, one or more other components of the segment 70 differ from the segment 40 in functionality or capacity (e.g., larger energy source). The segment 70 may include further components, as discussed above and below with reference to FIGS. 4A and 4C.

Figure 4C:
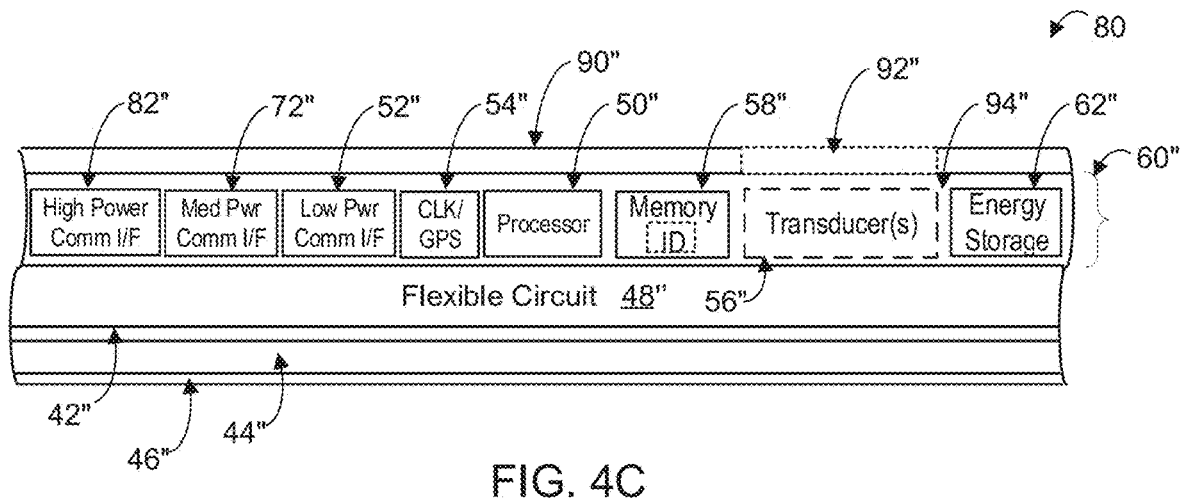

FIG. 4C shows a cross-sectional side view of a portion of an example segment 80 of the flexible adhesive tape-agent platform that includes a respective set of the components of the wireless transducing circuit 10 corresponding to the third tape-node type (e.g., black). The segment 80 is similar to the segment 70 of FIG. 4B, but further includes a high-power communications-interface 82" (e.g., a cellular interface; e.g., GSM/GPRS) in addition to a low-power communications-interface 52", and may include a medium-power communications-interface 72". The high-power communications-interface 82" has a range that provides global coverage to available infrastructure (e.g. the cellular network). In certain embodiments, one or more other components of the segment 80 differ from the segment 70 in functionality or capacity (e.g., larger energy source). The segment includes further components, as discussed above with reference to FIGS. 4A, and 4B.

FIGS. 4A-4C show embodiments in which the flexible covers 90, 90', 90" of the respective segments 40, 70, and 80 include one or more interfacial regions 92, 92', 92" positioned over one or more of the transducers 56, 56', 56". In certain embodiments, one or more of the interfacial regions 92, 92', 92" have features, properties, compositions, dimensions, and/or characteristics that are designed to improve the operating performance of the platform for specific applications. In certain embodiments, the flexible adhesive tape platform includes multiple interfacial regions 92, 92', 92" over respective transducers 56, 56', 56", which may be the same or different depending on the target applications. Interfacial regions may represent one or more of an opening, an optically transparent window, and/or a membrane located in the interfacial regions 92, 92', 92" of the flexible covers 90, 90', 90" that is positioned over the one or more transducers and/or transducers 56, 56', 56". Additional details regarding the structure and operation of example interfacial regions 92, 92', 92" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 94, 94', 94" encapsulates the respective device layers 60, 60', 60" and thereby reduces the risk of damage that may result from the intrusion of contaminants and/or liquids (e.g., water) into the device layer 60, 60', 60". The flexible polymer layers 94, 94', 94" may also planarize the device layers 60, 60', 60". This facilitates optional stacking of additional layers on the device layers 60, 60', 60" and also distributes forces generated in, on, or across the segments 40, 70, 80 so as to reduce potentially damaging asymmetric stresses that might be caused by the application of bending, torquing, pressing, or other forces that may be applied to the segments 40, 70, 80 during use. In the illustrated example, a flexible cover 90, 90', 90" is bonded to the planarizing polymer 94, 94', 94" by an adhesive layer (not shown).

The flexible cover 90, 90', 90" and the flexible substrate 44, 44', 44" may have the same or different compositions depending on the intended application. In some examples, one or both of the flexible cover 90, 90', 90" and the flexible substrate 44, 44', 44" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 90, 90', 90" and the adhesive layers 42, 42', 42", 46, 46', 46" on the top and bottom surfaces of the flexible substrate 44, 44', 44" typically include a pressure-sensitive adhesive (e.g., a silicon-based adhesive). In some examples, the adhesive layers are applied to the flexible cover 90, 90', 90" and the flexible substrate 44, 44', 44" during manufacture of the adhesive tape-agent platform (e.g., during a roll-to-roll or sheet-to-sheet fabrication process). In other examples, the flexible cover 90, 90', 90" may be implemented by a prefabricated single-sided pressure-sensitive adhesive tape and the flexible substrate 44, 44', 44" may be implemented by a prefabricated double-sided pressure-sensitive adhesive tape; both kinds of tape may be readily incorporated into a roll-to-roll or sheet-to-sheet fabrication process. In some examples, the flexible substrate 44, 44', 44" is composed of a flexible epoxy (e.g., silicone).

In certain embodiments, the energy storage device 62, 62', 62" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 52, 52', 52" and/or the processor(s) 50, 50', 50" may be integrated on the flexible battery substrate. In some examples, one or more of such components also (e.g., the flexible antennas and the flexible interconnect circuits) may be printed on the flexible battery substrate.

In examples of manufacture, the flexible circuit 48, 48', 48" is formed on a flexible substrate by one or more of printing, etching, or laminating circuit patterns on the flexible substrate. In certain embodiments, the flexible circuit 48, 48', 48" is implemented by one or more of a single-sided flex circuit, a double access or back-bared flex circuit, a sculpted flex circuit, a double-sided flex circuit, a multilayer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 40, 70, 80 shown in FIGS. 4A-4C, the flexible circuit 48, 48', 48" represents a single-access flex-circuit that interconnects the components of the adhesive tape platform on a single side of the flexible circuit 48, 48', 48". However, in other embodiments, the flexible circuit 48, 48', 48" represents a double access flex circuit that includes a front-side conductive pattern that interconnects the low-power communications interface 52, 52', 52", the timer circuit 54, 54', 54", the processor 50, 50', 50", the one or more sensor transducers 56, 56', 56" (if present), and the memory 58, 58', 58", and allows through-hole access (not shown) to a back-side conductive pattern that is connected to the flexible battery (not shown). In these embodiments, the front-side conductive pattern of the flexible circuit 48, 48', 48" connects the communications circuits 52, 52', 52", 72', 72", 82" (e.g., receivers, transmitters, and transceivers) to their respective antennas and to the processor 50, 50', 50" and also connects the processor 50, 50', 50" to the one or more sensors and the memory 58, 58', and 58". The backside conductive pattern connects the active electronics (e.g., the processor 50, 50', 50", the communications circuits 52, 52', 52", 72', 72", 82" and the transducers) on the front-side of the flexible circuit 48, 48', 48" to the electrodes of the energy storage device 62, 62', 62" via one or more through holes in the substrate of the flexible circuit 48, 48', 48".

Electronics Sampling

Embodiments of the present disclosure include electronics sampling to optimize system performance, cost, and confidence levels by balancing dynamic and stationary configurations without master-slave interactions.

The wireless transducing circuits 10 described herein may be used in a wide variety of different applications, including logistics, sensing, tracking, positioning, warehousing, parking, safety, construction, event detection, road management and infrastructure, security, and healthcare. In some examples, the platforms 32 are used in various aspects of logistics management, including sealing packages, transporting packages, tracking packages, monitoring the conditions of packages, inventorying packages, and verifying package security. In these examples, the sealed packages typically are transported from one location to another by truck, train, ship, or aircraft.

Depending on the target application, the wireless transducing circuits 10 are distributed across multiple platforms 32 according to a specified sampling density, which is the number of wireless transducing circuits 10 for a given unit size (e.g., length or area) of the set of platforms 32. In some embodiments, a set of platforms 32 include different respective sampling densities of wireless transducing circuits 10 to seal different package sizes with a desired number of wireless transducing circuits 10. In some embodiments, the set of platforms 32 including different respective sampling densities of wireless transducing circuits 10 may not be used to seal packages. In embodiments, the number of wireless transducing circuits 10 per package size is given by the product of the sampling density specified for the platform 32 and the respective size of the platform 32 needed to seal the package. This allows an automated packaging system to select the appropriate type of platform 32 to use for sealing a given package with the desired redundancy (if any) in the number of wireless transducer circuits 10. In some embodiments, such as shipping low value goods, only one wireless transducing circuit 10 is used per package, if any, whereas in other applications (e.g., shipping high value goods) multiple wireless transducing circuits 10 are used per package. Thus, a platform 32 with a lower sampling density of wireless transducing circuits 10 can be used for the former application, and a platform 32 with a higher sampling density of wireless transducing circuits 10 can be used for the latter application. In some examples, the platforms 32 are color-coded or otherwise marked to indicate the respective sampling densities with which the wireless transducing circuits 10 are distributed across the different types of platforms 32.

Some logistics applications do not require tracking and/or sensor data for every package shipped. Instead, sufficient information for decision-making can be obtained by collecting data from a sample of the packages shipped. In embodiments, a substantial reduction in shipping costs can be realized by selecting a sampling density of the deployed wireless transducing circuits 10 that achieves a target tracked package sampling rate that is less than unity. Similarly, a sampling density of less than unity may be selected for functionality that collected environmental data, such as temperature sensors, vibration sensors, etc. In these embodiments, some packages would not be tracked, monitored, or used to collect environmental data. However, the sample size can be selected to be sufficient to make inferences about the total population of packages shipped, and their surrounding environment, with a desired level of accuracy.

Figure 5A:
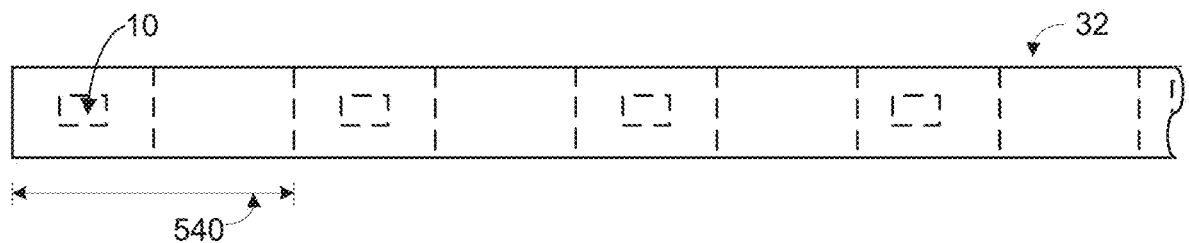
FIGS. 5A-5D show diagrammatic top views of respective portions of examples of different respective flexible adhesive tape platforms, according to embodiments.

For example, FIG. 5A shows an example length of a set of platforms 32 in which the sampling density is 0.5 (i.e., one wireless transducing circuit per two-unit lengths 540 of the platform 32). In this example, assuming the unit length corresponds to the length of the platform 32 needed to seal a package (e.g., package 110) and the platform 32 is cut along the dashed lines, half of the packages would be sealed with a length of the platform 32 that includes wireless transducing circuits 10, while the other half of the packages would be sealed with a platform 32 (dummy platform) that does not include a wireless transducing circuit 10.

Figure 5B:
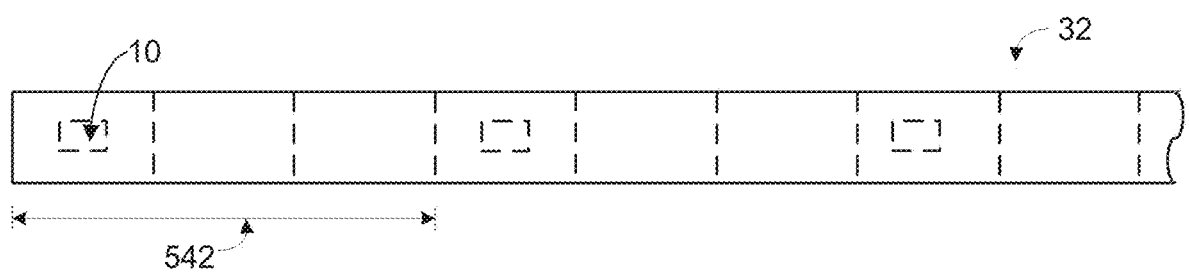

FIG. 5B shows an example length of the platform 32 in which the sampling density is one-third (i.e., one wireless transducing circuit per three-unit lengths 542 of the platform 32). In this example, assuming the unit length corresponds to the length of the platform 32 to seal a package and the platform 32 is cut along the dashed lines, one third of the packages would be sealed with a length of the platform 32 that includes wireless transducing circuits 10, while the remaining two-thirds of the packages would be sealed with a platform 32 (dummy platform) that does not include a wireless transducing circuit 10.

Figure 5C:
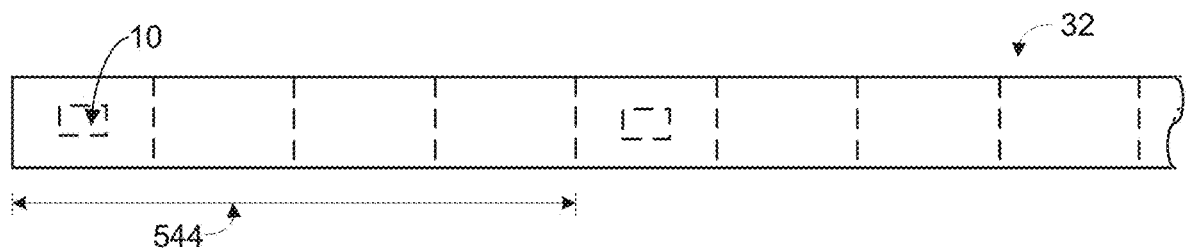

FIG. 5C shows an example length of the platform 32 in which the sampling density is 0.25 (i.e., one wireless transducing circuit per four-unit lengths 544 of the platform 32). In this example, assuming the unit length corresponds to the length of the platform 32 needed to seal a package and the platform 32 is cut along the dashed lines, one fourth of the packages be sealed with a length of the platform 32 that includes wireless transducing circuits 10, while the remaining three-fourths of the packages would be sealed with a platform 32 (dummy platform) that does not include a wireless transducing circuit 10.

Figure 5D:
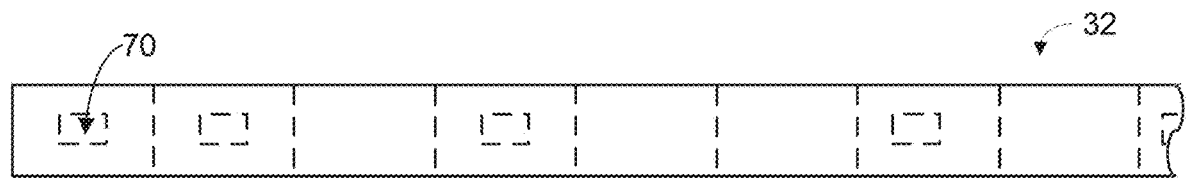

FIG. 5D shows an example length of the platform 32 in which the sampling rate of the wireless transducing circuits 10 are pseudo randomly distributed along the length of the platform 32 according to a probability distribution (e.g., a Nyquist distribution, etc.). Assuming the unit length corresponds to the length of the platform 32 needed to seal a package and the platform 32 is cut along the dashed lines, one half of the packages would be sealed with a length of the platform 32 that includes wireless transducing circuits 10, while the remaining half of the packages would be sealed with a platform 32 (dummy platform) that does not include a wireless transducing circuit 10.

In some embodiments, unlike FIGS. 5A-5D, the plurality of wireless transducing circuits is distributed to every platform 32 of the continuous set of platforms. In this embodiment, the components (e.g., sensors and wireless-communication interfaces) of the wireless transducing circuits 10 may vary periodically. For example, every fifth wireless transducing circuit may include a temperature sensor; every third wireless transducing circuit 10 may include a vibration sensor; every tenth wireless transducing circuit 10 may include a low-power wireless-communications interface; etc. Further, the network service application (e.g., network service application 962, 1008) can request certain environmental data, such as temperature data, vibration data, etc. from the wireless transducing circuits that include the respective sensors.

In the examples shown in FIGS. 5A-5D, a plurality of wireless transducing circuits 10 is distributed across the continuous set of platforms 32 according to a respective sampling density. Each wireless transducing circuit 10 includes an antenna (e.g., antennas 15, 18), a wireless communications circuit (e.g., communications circuits 13, 16) coupled to the antenna, a transducer (e.g., sensing transducer 24), a controller electrically connected to the wireless communications circuit and the transducer, and an energy source (e.g., energy store 22) connected to the controller, the transducer, and the wireless communications circuit. In some embodiments, the wireless transducing circuits 10 are uniform in function and composition. In some embodiments, the sampling density is the density of wireless transducing circuits 10 as a function of a unit size of the continuous set of platform 32. In some embodiments, the wireless transducing circuits 10 are interspersed among regions of the set of platforms 32 that are free of any wireless transducing circuits. In some embodiments, the wireless transducing circuits 10 are interspersed among the regions of the set of platforms 32 that are free of any wireless transducing circuits 10 according to a linear sampling density. In some embodiments, each of the regions of the set of platforms 32 that are free of any wireless transducing circuits 10 is free of active electrical components (e.g., dummy platforms). In other embodiments, the wireless transducing circuits 10 are interspersed among the regions of the set of platforms 32 that are free of any wireless transducing circuits 10 according to a real sampling density. In some embodiments, the wireless transducing circuits 10 are distributed at regular intervals along the continuous platform 32. In some embodiments, the wireless transducing circuits 10 are distributed across the set of platforms 32 according to a probability distribution. In some embodiments, the set of platforms 32 is carried on a cylindrical tape core. In some embodiments, the regions of the continuous platform 32 that include wireless transducing circuits 10 are visually indistinguishable from other regions of the continuous platform 32.

In some embodiments, multiple different types of platforms 32 are bundled together and packaged as a set (e.g., roll 116). In these embodiments, the set of platforms 32 typically are carried on respective cylindrical tape cores and include respective pluralities of wireless transducing circuits 10 distributed across the respective platforms 32 according to respective sampling densities at least two of which are different. In some embodiments, a first platform 32 in the set includes a backing that includes a first visible marking and a second platform 32 includes a backing that includes a second visible marking that is different from the first visible marking. In some examples, the first and second platforms 32 are color-coded differently (e.g., the backing of different tape platforms are different respective colors).

In some embodiments, the platforms 32 are used to monitor packages. In accordance with one example, unit-size portions of a set of platforms 32 are dispensed, where the set of platforms 32 includes a plurality of wireless transducing circuits 10 distributed across the platform according to a sampling density of wireless transducing circuits 10 as a function of the unit size portions of the set of platforms 32 and the sampling density is less than 1. The dispensed portion of the set of platforms 32 is affixed to seal a package (e.g., package 110). A network node of a network service (e.g., the network service 954 of an inventory management system and/or network 1000) establishes a wireless connection with the wireless transducing circuit 10 in the affixed dispensed portion of set of platforms 32. Based on a successful establishment of the wireless connection with the wireless transducing circuit 10, a unique identifier (e.g., identifier 122) of the wireless transducing circuit 10 and transducer data from the wireless transducing circuit 10 are obtained. The obtained transducer data is reported in association with the unique identifier to a network node of a network service (e.g., the network service 954 of an inventory management system or network 1000). In some examples, the obtained transducer data includes geographic location data. In some examples the obtained transducer data includes sensor data characterizing ambient conditions (e.g., temperature data, vibration data, humidity data, etc.) in the vicinity of the dispensed portion of the set of platforms 32.

Because battery power is finite and the power needs of any particular platform 32 generally is unknown, some examples of the platform 32 are preconfigured in a power-off state and remain in the power-off state until a predetermined event occurs. In some cases, the predetermined event indicates that the platform 32 has been deployed for use in the field. Example events include cutting an individual platform 32 from a roll (e.g., roll 116), bending the platform 32 as it is being peeled off of the roll, separating the platform 32 from a backing sheet, and detecting a change in state of the platform 32 or its environment. In some examples, a label is affixed to packaging containing the continuous platform 32, where the label has markings (e.g., text and/or bar code) that include an indication of the sampling density of wireless transducing circuit 10 as a function of a unit size of the set of platforms 32. In some examples, the unit size corresponds to a length dimension; in other examples the unit size corresponds to an aerial dimension.

In some of the platforms 32, there are no wireless transducing circuits 10 (i.e., there are no electronics in the tapes); this may be referred to a dummy platform. In some embodiments, one out of five assets may have electronics (e.g., a wireless transducing circuit 10 or portions thereof, such as only the wireless-communications interface) in the platform 32 to determine a confidence level of the assessments. Instead of paying to include a wireless transducing circuit 10 in every platform 32, attached to an asset, a wireless transducing circuit 10 may be included in one attached platform 32 out of every five. In some embodiments, some wireless transducing circuits 10 may include a portion of the units, e.g., an antenna, temperature sensor, etc. In embodiments, the electronics of each platform 32 may be different but physical appearance of the platform 32 may be nearly identical.

Figure 7:
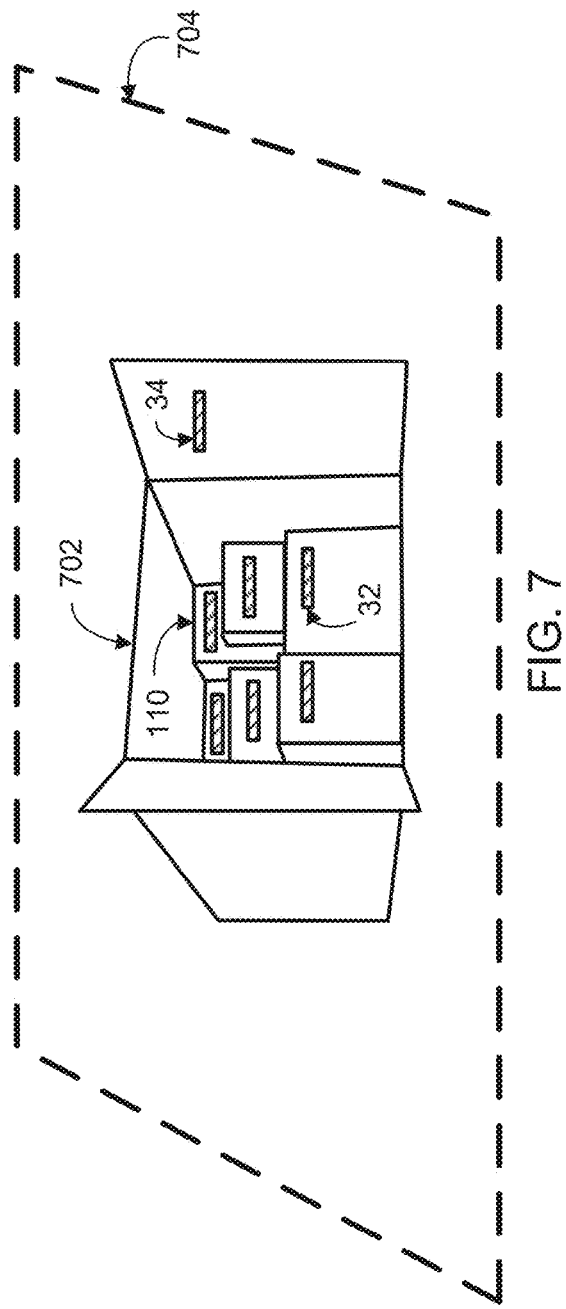
FIG. 7 shows an example storage container within a facility that includes a number of packages, some of which include a wireless transducing circuit, according to embodiments.
Figure 8:
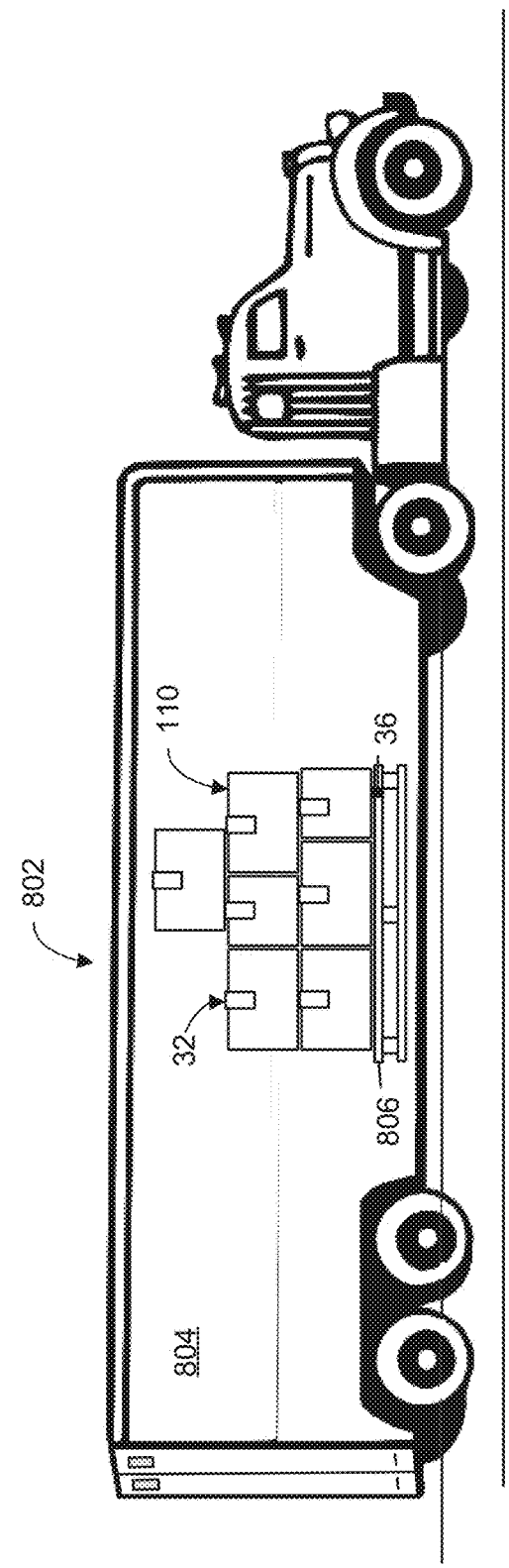
FIG. 8 shows a delivery truck with an attached trailer that includes a number of packages, some of which include a wireless transducing circuit, according to embodiments.

The aforementioned embodiments of applying individual platforms 32, from a set of platforms, to packages 110, according to a sampling rate, may begin in a manufacturing or shipping warehouse (FIG. 6), and the tracking and monitoring of the environmental factors surrounding the packages may continue on a path of travel for each package, such as within a delivery truck (FIG. 7) and at an intermediary shipping facility (FIG. 8).

Figure 6:
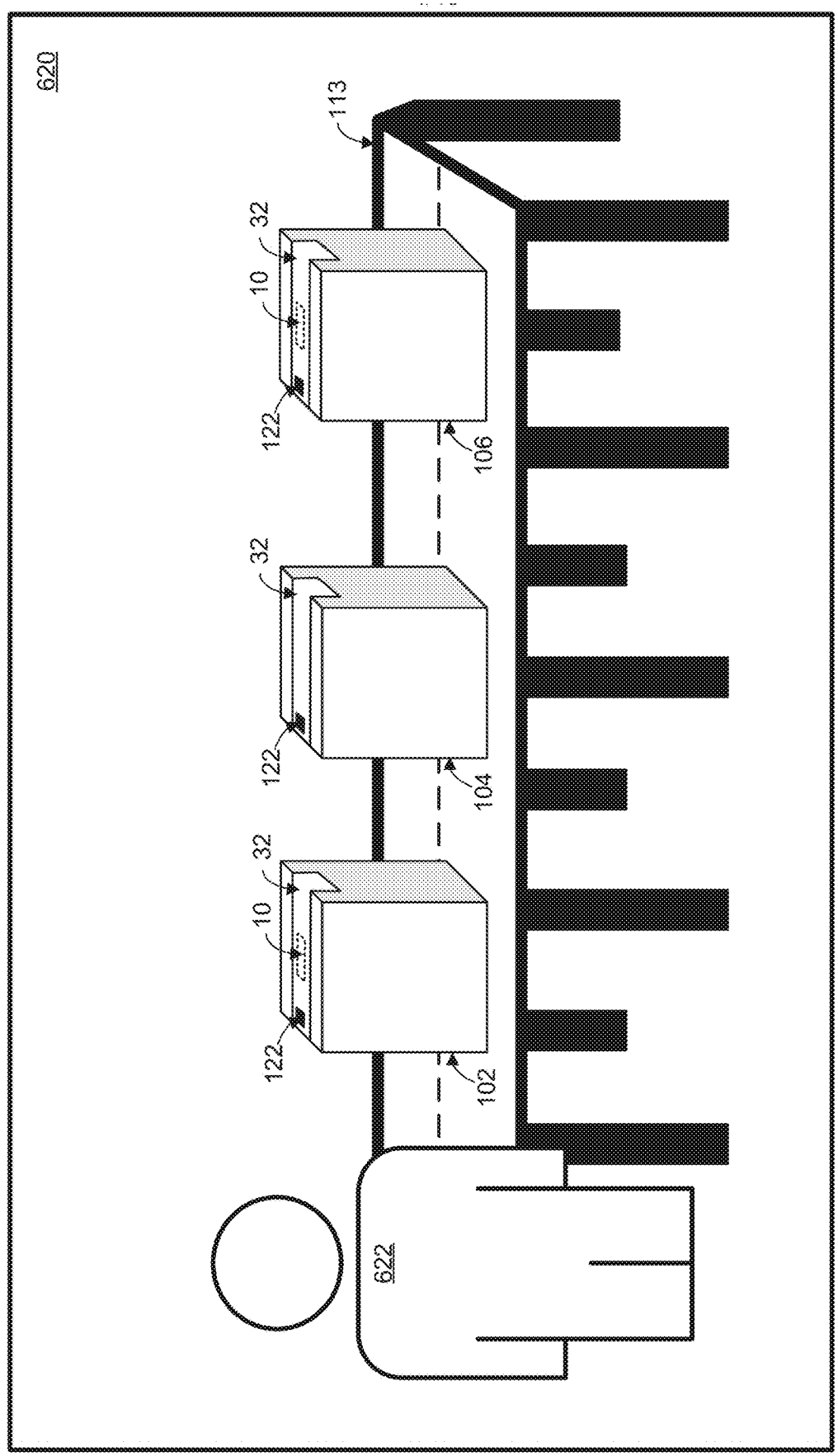
FIG. 6 shows an assembly line that includes a sampling distribution of wireless transducing circuits applied to packages, according to various embodiments.

FIG. 6 shows an example of applying the roll 116 with a set of platforms 32 in which the sampling density is 0.5, as discussed in FIG. 5A, to packages 102-106 within a manufacturing plant. As can be seen, an authorized user 622 may be moderating the application of the set of platforms 32 to packages 102-106. In embodiments, the authorized user may have a client device (e.g., client device 958) that includes an application (e.g., client application 66) having a display (e.g., display 968) that shows a sampling rate for a particular set of packages and a corresponding roll (e.g., roll 116). Each package 102-106 includes a platform 32 and a corresponding unique identifier 122, which may be used by a network (e.g., network 952 and/or network 1000) to categorize each platform 32 within the roll 116. The packages 102, 106 have been sealed using a platform 32 that include a wireless transducing circuit 10, while the package 104 has been sealed using a platform 32 (dummy platform) that does not include a wireless transducing circuit 10. In some embodiments, the packages 102, 106 may include platforms 32 with embedded sensors, such as temperature sensors, vibration sensors, etc. In some embodiments, there may not be a noticeable difference between the platforms 32 on packages 102, 106 and the dummy platform on package 104. For example, the area of the platform 32 where the wireless transducing circuit 10 is located may be covered in a material that obfuscates the wireless transducing circuit 10.

FIG. 7 shows a shipping container 702 of packages 110 within a facility 704 (e.g., a shipping center). The packages 110 each have platforms 32 attached thereto according to a sampling rate determined according to a predetermined criteria, discussed below. A platform 34 may be attached to the shipping container 702 and may include a wireless transducing circuit 10 with an embedded wireless-communications interface that is of a higher power than a wireless-communications interface of platforms 32 attached to packages 110. For example, the wireless transducing unit of the platforms 32 attached to the packages 110 may be a master agent, as discussed above, with a low-power wireless-communications interface (e.g., low-power wireless-communications interface 52); and the wireless transducing circuits of the platform 34 attached to the shipping container may be a secondary or tertiary agent, as discussed above, that includes a low, medium, and/or high-power wireless-communications interface (e.g., low, medium, and/or high-power wireless-communications interface 52, 52', 52", 72', 72", 82"), with communication capabilities to communicate with the network (e.g., network 952 and/or network 1000) and the wireless transducing circuit within the platform 32. In this embodiment, if the packages 110 within the shipping container stay together throughout delivery, the sampling rate of platforms 32 that include a wireless transducing circuit that includes a low-power wireless-communication interface may be one or two per the group of packages 110 within the shipping container 702. Only one platform 32 that includes a low-power wireless-communication interface is necessary for determining the location of the group of packages 110 or the shipping container 702.

Similarly, only one, or very few, temperature sensor, vibration sensor, etc. is necessary to collect particular environmental data surrounding or within the shipping container 702. For example, a platform 32 may include a wireless-communications interface and a temperature sensor and the platform 34 may include a wireless-communications interface. To transmit the temperature of the shipping container 702 to the network, the wireless-communication interface of the platform 34 may receive an instruction to collect temperature data of the shipping container 702. The platform 34 may instruct the platform 32 to collect temperature data and then transmit the temperature data to the platform 34. The platform 34 may then transmit the temperature data to the network.

FIG. 8 shows a delivery truck 802 with a pallet 806 of packages 110 located in a trailer 804. The packages 110 are sealed with platforms 32 according to a sampling rate, based on a predetermined criteria, discussed below. In some embodiments, the platforms 32 do not seal the packages 110 but are adhesively applied to the packages 110. The platform 32 may be a master agent, as discussed above, with a low-power wireless-communications interface (e.g., low-power wireless-communications interface 52); a platform 36, attached to the pallet 806, may be a secondary or tertiary agent and include a wireless transducing unit with a medium and/or high-power wireless-communications interface (e.g., low, medium, and/or high-power wireless-communications interface 52, 52', 52", 72', 72", 82"), with communication capabilities of communicating with a network (e.g., network 952 and/or network 1000) and the wireless transducing circuit within the platform 32.

In embodiments, the trailer 804 may be air conditioned to preserve perishable goods, within the packages 110, that are sensitive to temperature. If the packages 110 on the pallet 806 stay together throughout delivery, only one, or few, temperature sensors embedded within the platforms 32 or the platform 36 is necessary to collect temperature data for an accurate measurement of temperature within the trailer 804. Likewise for vibration data, humidity data, etc. within the trailer 804. Similar to the embodiment discussed in FIG. 7, platform 32 may include a wireless-communications interface and a temperature sensor, and the platform 36 may include a wireless-communications interface. To transmit the temperature of the trailer 804 to the network, the wireless-communication interface of the platform 36 may receive an instruction from the network (e.g., the network 1000, 952) to collect temperature data of the trailer 804. The platform 36 may instruct the platform 32 to collect temperature data and then transmit the temperature data to the platform 36. The platform 34 may then transmit the temperature data to the network.

In embodiments, with reference to FIGS. 7 and 8, there may be set of shipping containers 702 or a set of pallets 806, respectively, that stay together during the physical route. In this case, each shipping container 702 may include a platform 34 along with a package 110 within the shipping container 702 sealed with a platform 32; and each pallet 806 may include a platform 36 along with a package 110 on the pallet 806 sealed with a platform 32. Or, because there is a high likelihood that the shipping containers 702 and the pallets 806 are going to stay together throughout the physical route, there may be a single shipping container 702 having a platform 34 along with a package 110 inside with a platform 32; and a single pallet 806 having a platform 36 along with a package 110 with a platform 32. Any permutation taking inputs, such as environmental conditions, physical route, value of assets, etc. may be considered for a sampling rate.

Figure 9:
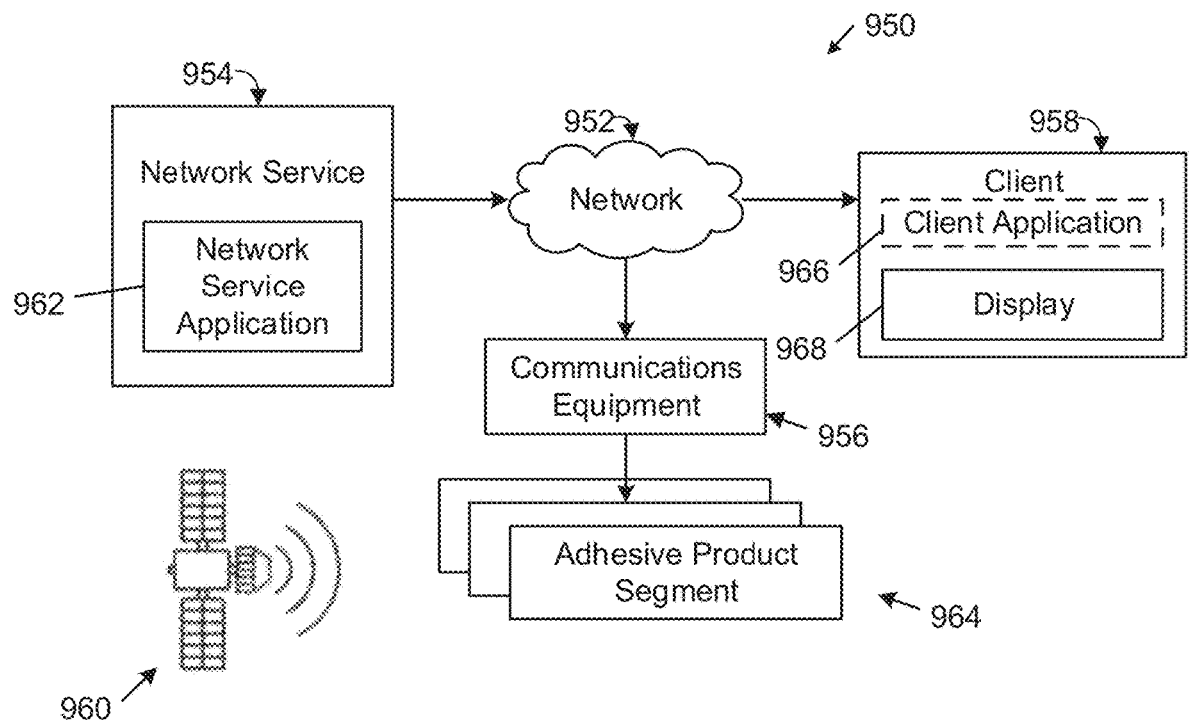
FIG. 9 is a diagrammatic view of an example of a network environment supporting communications with various agents, according to an embodiment.

FIG. 9 shows an example network environment 950 that includes a network 952 that supports communications between a network service 954, communications equipment 956, and a client device 958 (e.g., a laptop, smart phone, etc. of an authorized user 622). The network 952 includes one or more network communication systems and technologies, including any one or more of wide area networks, local area networks, public networks (e.g., the internet), private networks (e.g., intranets and extranets), wired networks, and wireless networks. The communications equipment 956 includes any one or more of (i) satellite 960 based tracking systems (e.g., GPS, GLONASS, and NAVSTAR) that transmit geolocation data that can be received by suitably equipped receivers in segments of the adhesive tape platform 32 (FIG. 2, 3, 6-8), (ii) cellular based systems that use mobile communication technologies (e.g., GSM, GPRS, CDMA, etc.) to implement one or more cell-based localization techniques, and (iii) communications equipment 956, such as wireless access points (e.g., Wi-Fi nodes, Bluetooth nodes, ZigBee nodes, etc.) and other shorter range localization technologies (e.g., ultrasonic localization and/or dead reckoning based on motion sensor measurements). For example, the segments wireless transducing circuits 10 may include the high-power wireless-communication interface 82", FIG. 3C, and receive the geolocation data from the satellite 960. From there, the wireless transducing circuit 10 that includes the high-power wireless-communication interface 82" may transmit the received geolocation data, or any other signals transmitted from the satellite 960, to wireless transducing circuits with high-power wireless-communication interfaces 82", medium-power wireless-communication interfaces 72", 72 and/or low-power wireless-communication interface 52", 52', 52. In some embodiments, the satellite transmits the geolocation data, or any other type of data, to the medium-power wireless-communication interfaces 72", 72 and/or low-power wireless-communication interface 52", 52', 52.

As explained in detail below, location data for one or more platforms 32 that include a wireless transducing circuit 10 can be obtained using one or more of the communications systems and technologies described above.

For example, a segment (e.g., segments 40, 70, 80, FIGS. 3A-C) of a platform 32 that includes a GPS receiver (e.g., wireless communication circuits 13, 16, FIG. 1) is operable to receive location data (e.g., geolocation data) from the Global Positioning System (GPS). In this process, the platform 32 periodically monitors signals from multiple GPS satellites (e.g., satellite 960). Each signal contains information about the time the signal was transmitted and the position of the satellite 960 at the time of transmission. Based on the location and time information for each of four or more satellites, the GPS receiver determines the geolocation of the platform 32 and the offset of its internal clock (e.g., atomic clock 21, clock 54, 54', 54") from true time. Depending on its configuration, the platform 32 can either forward the received GPS location data to the network service 954 to determine its geolocation, or first compute geolocation coordinates from the received GPS location data and report the computed geolocation coordinates to the network service 954. However, the platform 32 can only determine its GPS location when it is able to receive signals from at least four GPS satellites 960 at the same time. As a result, GPS localization typically is limited or unavailable in urban environments and indoor locations.

Instead of or in addition to GPS localization, a platform 32 can be configured to determine or assist in determining its location using terrestrial positioning techniques. For example, Received Signal Strength Indicator (RSSI) techniques may be used to determine the location of a platform 32. These techniques include, for example, fingerprint matching, trilateration, and triangulation. In an example RSSI fingerprinting process, one or more predetermined radio maps of a target area are compared to geo-reference RSSI fingerprints that are obtained from measurements of at least three wireless signal sources (e.g., cellular towers or wireless access points) in the target area to ascertain the location of the platform 32. The predetermined radio maps typically are stored in a database that is accessible by the network service 954. In example RSSI triangulation and trilateration processes, the location of a platform 32 can be determined from measurements of signals transmitted from at least three omnidirectional wireless signal sources (e.g., cellular towers or wireless access points). Examples of the triangulation and trilateration localization techniques may involve use of one or more of time of arrival (TOA), angle of arrival (AOA), time difference of arrival (TDOA), and uplink-time difference of arrival (U-TDOA) techniques. RSSI fingerprint matching, trilateration, and triangulation techniques can be used with cellular and wireless access points that are configured to communicate with any of a variety of different communication standards and protocols, including GSM, CDMA, Wi-Fi, Bluetooth, Bluetooth Low Energy (BLE), LoRa, ZigBee, Z-wave, and RF.

In some examples, a platform 32 that includes a GSM/GPRS transceiver can scan GSM frequency bands for signals transmitted from one or more GSM cellular towers. For each signal received by the platform 32, the platform 32 can determine the signal strength and the identity of the cellular tower that transmitted the signal. The platform 32 can send the signal strength and transmitter identifier to the network service 954 to determine the location of the platform 32. If signal strength and transmitter identifier is available from only one cellular tower, the network service 954 can use nearest neighbor localization techniques to determine the location of the platform 32. If signal strength and transmitter identifier is received from two or more cellular towers, the network service 954 can use localization techniques, such as fingerprint matching, trilateration, and triangulation, to calculate the position of the platform 32.

In some examples, a platform 32 that includes a Wi-Fi (Wireless-Fidelity) transceiver can scan Wi-Fi frequency bands for signals transmitted from one or more Wi-Fi access points. For each signal received by the platform 32, the platform 32 can determine the signal strength and the identity of the access point that transmitted the signal. The platform 32 can send the signal strength and transmitter identifier information to the network service 954 to determine the location of the platform 32. If signal strength and transmitter identifier information is available from only one Wi-Fi access point, the network service 954 can use nearest neighbor localization techniques to determine a location of the platform 32. If signal strength and transmitter identifier information is received from two or more Wi-Fi access points, the network service 954 can use localization techniques, such as trilateration, and triangulation, to calculate the position of a platform 32. RSSI fingerprint matching also can be used to determine the location of the platform 32 in areas (e.g., indoor and outdoor locations, such as malls, warehouses, airports, and shipping ports) for which one or more radio maps have been generated.

In some examples, the wireless transceiver in the platform 32 can transmit a wireless signal (e.g., a Wi-Fi, Bluetooth, Bluetooth Low Energy, LoRa, ZigBee, Z-wave, and/or RF signal) that includes the identifier of the platform 32. The wireless signal can function as a beacon that can be detected by a mobile computing device (e.g., a mobile phone) that is suitably configured to ascertain the location of the source of the beacon. In some examples, a user (e.g., an authorized user 622 affiliated with the network service 954) may use the mobile computing device to transmit a signal into an area (e.g., a warehouse) that includes the identifier of a target platform 32 and configures the target platform 32 to begin emitting the wireless beacon signal. In some examples, the target platform 32 will not begin emitting the wireless beacon signal until the user/operator self-authenticates with the network service 954.

The network service 954 includes one or more computing resources (e.g., server computers) that can be located in the same or different geographic locations. The network service may execute one or more of a variety of different applications, including event detection applications, monitoring applications, security applications, notification applications, and tracking/positioning applications.

In one example, the network service 954 executes a positioning application 962 to determine the locations of activated platforms 32 (e.g., the platforms 32 within the shipping container 702 or the trailer 804). In some examples, based on execution of the positioning application 962, the network service 954 receives location data from one or more of the platforms 32. In some examples, the network service 954 processes the data received from platforms 32 to determine the physical locations of the platform 32. For example, the platform 32 may be configured to obtain positioning information from signals received from a satellite system (e.g., GPS, GLONASS, and NAVSTAR), cell towers, or wireless access points, and send the positioning information to the network service 954 to ascertain the physical locations of the platforms 32 and corresponding assets the platforms 32 are attached thereto. In other examples, the platforms 32 are configured to ascertain their respective physical locations from the signals received from a satellite system (e.g., GPS, GLONASS, and NAVSTAR), cell towers, or wireless access points, and to transmit their respective physical locations to the network service 954. In either or both cases, the network service 954 typically stores the positioning information and/or the determined physical location for each platform 32 in association with the respective unique identifier (e.g., the identifier 122) of the platform 32. The stored data may be used by the network service 954 to determine time, location, and state (e.g., sensor based), or environmental information about the platform 32 and the objects or persons to which the platform 32 are attached. Examples of such information include tracking the environmental conditions surrounding (e.g., temperature, humidity, movement, vibration, etc.) or state of the current location of a platform 32, determining the physical route traveled by the platform 32 over time, and ascertaining stopover locations and durations.

As shown in FIG. 9, the client device 958 includes a client application 966 and a display 968. The client application 966 establishes sessions with the network service 954 during which the client application obtains information regarding the states (e.g., locations), environmental conditions (e.g., temperature, humidity, etc.), and events (e.g., shipping information, such as rest point in shipping centers, etc.) relating to the platform 32. In some examples, an authorized user (e.g., the authorized user 622) of the client device 958 must be authenticated before accessing the network service 954. In this process, the user typically presents multiple authentication factors to the system (e.g., user name and password). After the user is authenticated, the network service 954 transmits to the client device 958 data associated with the user's account, including information relating to the platform 32 that are associated with the user's account. The information may include, for example, the state (e.g., current location) and events relating to a particular platform 32, the physical route traveled by the platform 32 over time, stopover locations and durations, environmental conditions surrounding within a proximity of the platforms 32, and state and/or changes in state information (as measured by one or more sensors associated with the platform 32). The information may be presented in a user interface on the display 968. State information (including location) may be presented in the user interface in any of a variety of different ways, including in a table, chart, or map. In some examples, the location and state data presented in the user interface are updated in real time.

In some embodiments, the network service 954 may track sensor data and determine such environmental factors as temperature, vibration, time, location, humidity, etc. of an environment surrounding the assets and/or packages the platforms 32 are attached thereto. In some embodiments, as discussed in FIG. 5A-D, not every asset will have a platform 32 that includes a certain type of sensor or a wireless transducing circuit 10. Due to the stress of having a wireless transducing circuit 10, that include all available sensors, the wireless transducing circuits 10 and sensors for particular types of sensor data collection will be distributed across a set of platforms 32 of a roll 116 according to a performance of sampling in time. For example, there may be a certain cycle time of shipments of packages and assets through a shipment facility, where every four minutes a package with a platform 32 attached thereto passes through the facility. Rather than attaching a platform 32 that includes a temperature sensor to every package that passes through the facility and measuring the temperature every 16 minutes; instead, one out of every four packages may have an attached platform 32 with a temperature sensor embedded within. The temperature sensors may be spaced appropriately so that the temperature of the facility is measured every 16 minutes; or every fourth package with a platform 32 includes a temperature sensor. This approach reduces the cost of the temperature feature by 75%. In some embodiments, this approach of selectively embedding certain sensors within platforms may be considered for vibration sensors, clocks, etc.

In some embodiments, there are more platforms 32 with communication capabilities than with a certain type of sensor (e.g., temperature sensor). In this embodiment, the platforms 32 with communication capabilities, (e.g., the low, medium, or high-power wireless-communication interface or the communication modules 12, 14) determine which platforms 32 within a proximity (e.g., 30 feet, within the same building, etc.) of them have a temperature sensor and then instruct the platform 32 with the temperature sensor to measure the temperature and transmit that sensor data to platforms 32 without the temperature sensor. In this embodiment, each platform 32 with a temperature sensor will have a wireless-communications interface for transmitting the collected temperature data. Agents may delegate responsibilities to platforms 32 that have other types of sensors, e.g., vibration sensor, humidity sensor, etc. For example, to reduce the cost of communication, the sampling rate may dictate, based on a predetermined criteria, that one out of every four platforms 32 include a particular wireless-communication interface (e.g., low, medium, and high-power wireless communication interfaces) that can communicate with the satellite 960 (e.g., the high-power wireless-communications interface), while one out of two platforms 32 include a wireless communication interface (e.g., low or medium wireless-communications interface) that allows the platform 32 to communicate with other platforms 32 in a nearby area, such as within a shipping facility (e.g., the shipping facility 704).

In some embodiments, a particular platform 32 may determine which platforms 32 in a nearby area have a battery life that satisfies a battery threshold by instructing all platforms 32 within the nearby area to transmit their current battery levels to the particular platform 32. From this, the battery levels of platforms 32 within the area may compare the battery levels to a predetermined battery level. For those platforms with battery levels not satisfying a threshold battery level, their battery may power down for an amount of time (e.g., an hour, two hours, etc.). Any sensor data collection will not include the platforms 32 that are powered down.

In some embodiments, sampling can be achieved by sampling the number of assets over a positional space, for example, by including sensors, clocks, wireless transducing circuits 10 within platforms 32, at certain positions throughout an environment (e.g., every column of a building within a shipping facility has a platform 32, every fifth column of a building has a platform, etc.). If vibration sensors are embedded within platforms 32 to detect an earthquake at shipping facility, e.g., then a single or very few vibration sensors are required to detect the earthquake. In some embodiments, the rate of assets passing through a shipping facility may be known and the platforms 32 attached to columns may be programmed to collect temperature data associated with particular platforms 32 passing through the shipping facility. In this embodiment, when determining the sampling rate for applying wireless transducing circuits to platforms 32 on a roll 116, the amount and position of platforms 32 spread out at various checkpoints (e.g., shipping facility) for a particular shipping route may be considered. Likewise, for collecting temperature data, if the spatial distribution of assets and packages are known, the known spatial distribution can be leveraged to sample across the space of a location (e.g., the packages stored in a warehouse, where the boxes are stored 5 feet apart from each other in horizontal and vertical directions, such as on racks, so only one or very few of the boxes requires a platform 32 with a temperature sensor embedded therein).

In some embodiments, the sampling rate is determined for when packages are in-route within a delivery truck 802, rather than for when the packages are stored within a warehouse (e.g., manufacturing center 620, shipping facility 704) for a fixed amount of time. A sampling rate will be considered that achieves a high level of confidence that a desired environmental data will be collected by at least a single environmental sensor (e.g., temperature sensor, vibration sensor, etc.) embedded within a platform (e.g., platforms 32, 34, 36) in each delivery truck 802. In a first example for determining a sampling rate, each delivery truck 802 carries thirty packages 110, ten packages 110 per pallet 806, and there are four delivery trucks 802 out in the field, totaling one-hundred twenty packages 110 on twelve pallets 806. To guarantee at least one temperature sensor is in every delivery truck 802, then ninety-one out of the one-hundred twenty packages 110 need to be equipped with platforms 32 that include a temperature sensor, or at least ten pallets 806 will have platforms 36 attached that include an embedded temperature sensor, or some combination thereof. In this case, the electronics sampling rate would result in a roll 116 of platforms 32 (e.g., the distribution of wireless transducing units 10 over a continuous platform 32, FIG. 5A-D) that has twenty-nine blank tapes out of one-hundred twenty total tapes. In some embodiments, the platforms 32 may be applied to the pallet 806 or the platform 36 may be attached to, or used to seal, a package 110.

In a second example, there may not be a need to guarantee that every delivery truck has a platform 32 with an embedded temperature sensor, e.g., if the packages 110 contain inexpensive goods. In this example, there are four delivery trucks each with thirty packages, totaling one-hundred packages 110. In this example, the number of packages 110 with platforms 32 that have embedded temperature sensors is reduced because there is no need to guarantee that every delivery truck includes a temperature sensor. Therefore, the number of temperature sensors embedded within platforms 32 on packages 110 is fewer than the ninety-one required in the example above. The sampling rate may depend on many factors, including the value of packaged goods, the likelihood that temperature will damage the packaged goods, the time the package 110 will be in-route, etc.

In some embodiments, each roll 116 (FIG. 3) of continuous adhesive-tape platforms 112 may be categorized with a unique identifier (e.g., identifier 122) within a database (e.g., database of the network 1000 or network 952) and have a roll 116 for specific applications (e.g., a roll with temperature sensors, vibration sensors, etc.) or for specific shipping equipment (e.g., palettes, boxes, packages, etc.). Platforms 32 within one roll 116 of tape may have different sensors to ensure that sensors can be statistically sampled. For example, a roll 116 may include a temperature sensor in every third platform 32, a vibration sensor in every fifth platform 32, Bluetooth in every twentieth platform 32, etc., such that a single roll 116 of platforms 32 may be applied to a set of packages 110 and obtain multiple forms of environmental data.

In some embodiments, all the platforms 32 in a roll 116 are assigned a same group identifier, e.g., based on the specific sensor embedded within the platform 32 (vibration sensing tape nodes, light sensing tape nodes, temperature sensing tape node, etc.). In some embodiments, the roll 116 may be categorized based on a specific function (e.g., measuring temperature data, tracking packages 110 in a nearby proximity, etc.) or based on platforms 32 that are assigned to a specific location (e.g., platforms 32 that are permanently attached to a building or are within a delivery truck, etc.). In some embodiments, a roll 116 may be categorized based on platforms 32 that include a wireless transducing circuit 10 that include a specific frequency of data communications (e.g., communicates data 2 times per day, or communicates data every hour). In some embodiments, platforms 32 that have a specific role in a network communications environment 1000 of platforms 32. In embodiments, a roll 116 may be categorized based off of a unique identifier of each platform 32 (e.g. mac address of wireless transducing circuit 10). For example, a MAC address with a last digit or bit having a specific value may be assigned to a specific roll 116.

Platforms 32 that are part of a roll 116 may be addressed by the network 952 (or network communications environment 1000) by their group identifier. For example, the network 1000 may issue the same set of instructions to all platforms 32 within a roll 116 (e.g., all tape nodes with a vibration sensor that have the same group identifier), e.g., to collect temperature data, vibration data, track a location of a package 110, etc. In some embodiments, the sampling frequency of sensors (e.g., temperature sensor, vibration sensor, etc.) in platforms 32 may vary. For example, some of the platforms 32 within a roll 116 are empty (don't have wireless components or circuit components).

Figure 10:
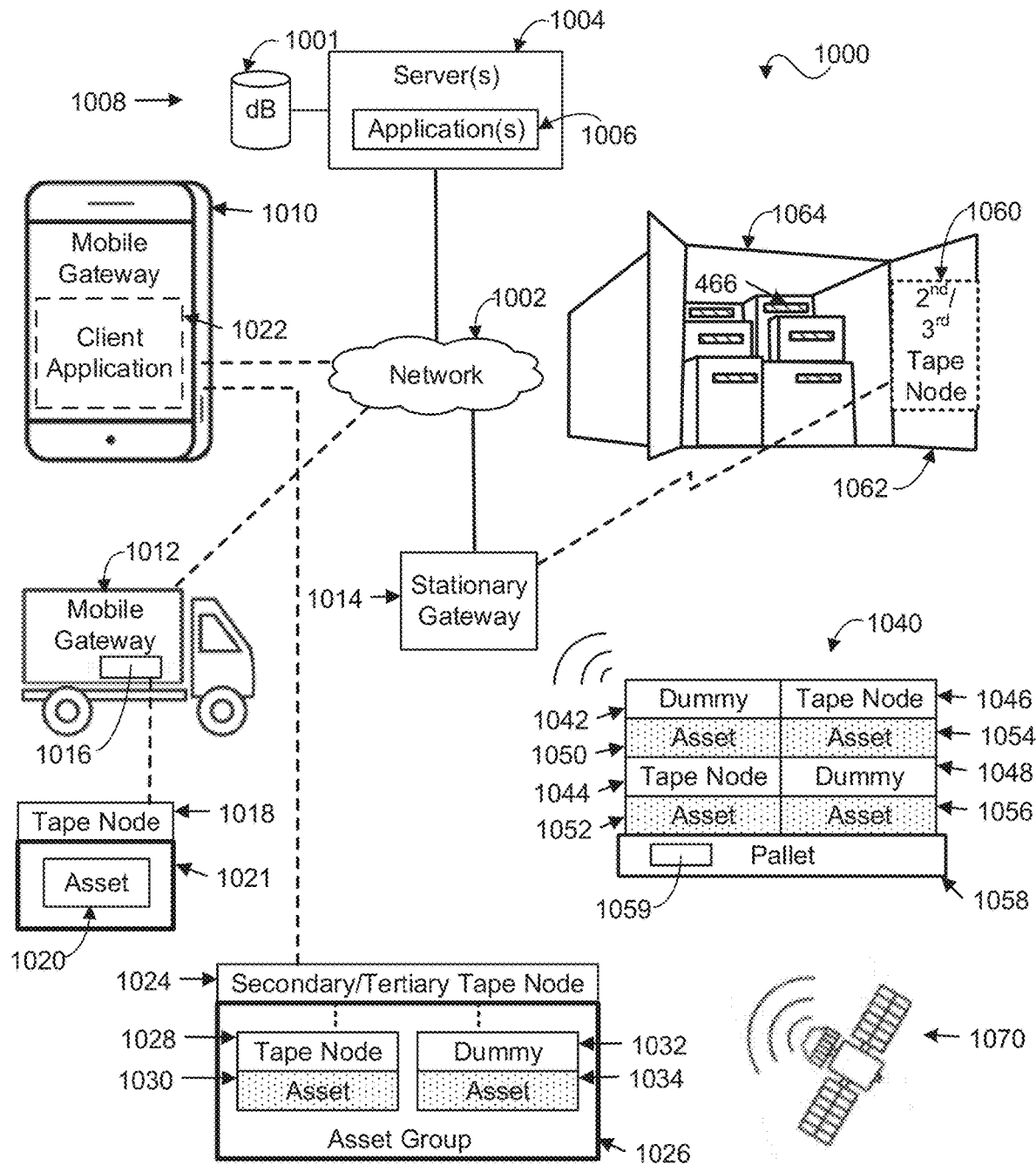
FIG. 10 is a diagrammatic view of an example of a network environment supporting communications with segments of an adhesive tape platform, according to an embodiment.

FIG. 10 shows an example network communications environment 1000 that includes a network 1002 that supports communications between one or more servers 1004, communicatively coupled to a database 1001, executing one or more applications 1006 of a network service 1008, mobile gateways 1010 (a smart device mobile gateway), 1012 (a vehicle mobile gateway), a stationary gateway 1014, and various types of tape nodes that are associated with various assets (e.g., parcels, equipment, tools, persons, and other things). Hereinafter "tape nodes" may be used interchangeably with the "agents", and "platforms", as described above, with reference to FIGS. 1-9; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 1002 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 1002 includes communications infrastructure equipment, such as a geolocation satellite system 1070 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create a hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 1020) or other stationary (e.g., stationary gateway 1014) or mobile object or gateway (e.g., such as a delivery truck 802) or stationary object (e.g., a structural element of a building within a shipping facility 704). This process activates the tape node (e.g., the tape node 1018) and causes the tape node 1018 to communicate with the one or more servers 1004 of the network service 1008. In this process, the tape node 1018 may communicate through one or more other tape nodes (e.g., the tape nodes 1044, 1046) in the communication hierarchy, that may be associated and categorized according to a roll 116, as discussed above. In this process, the one or more servers 1004 executes the network service application 1006 to programmatically configure tape nodes 1018, 1024, 1028, 1044, 1046, that are deployed in the network communications environment 1000, to collect, e.g., environmental data. These tape nodes 1024, 1028, 1044, 1046 may collected environmental data surrounding, or track, assets 1034, 1050, 1056 that have been sealed with a dummy tape node (dummy platform) 1032, 1042, 1048. In some examples, there are multiple classes or types of tape nodes (e.g., the master agent 132, secondary agent 136, or tertiary agent 140), where each tape node class has a different respective set of functionalities and/or capacities, as described above with respect to the "agents" and "platforms" in FIGS. 1-9. For example, the master agents 132 (with reference to FIGS. 1-3 and 4A) have a lower-power wireless communication interface (e.g., the low-power wireless-communication interface 52, with reference to FIG. 4A), in comparison to the secondary and tertiary agents 136, 140 (with reference to FIGS. 1-3 and 4A-C).

In some examples, the one or more servers 1004 communicate over the network 1002 with one or more gateways 1010, 1012, 1014 that are configured to send, transmit, forward, or relay messages to the network 1002 in response to transmissions from the tape nodes 1018, 1024, 1028, 1044, 1046 that are associated with respective assets and within communication range. Example gateways include mobile gateways 1010, 1012 and a stationary gateway 1014. In some examples, the mobile gateways 1010, 1012, and the stationary gateway 1014 are able to communicate with the network 1002 and with designated sets or groups of tape nodes.

In some examples, the mobile gateway 1012 is a vehicle (e.g., a delivery truck 802 or other mobile hub) that includes a wireless communications unit 1016 that is configured by the network service 1008 to communicate with a designated network of tape nodes, including tape node 1018 (e.g., a master tape node) in the form of a label that is adhered to a parcel 1021 (e.g., an envelope) that contains an asset 1020, and is further configured to communicate with the network service 1008 over the network 1002. In some examples, the tape node 1018 includes a lower-power wireless-communications interface of the type used in, e.g., segment 40 (shown in FIG. 4A), and the wireless communications unit 1016 may implemented by a secondary or tertiary tape node (e.g., one of segment 70 or segment 80, respectively shown in FIGS. 4B and 4C) that includes a lower-power communications interface for communicating with tape nodes within range of the mobile gateway 1012 and a higher-power communications-interface for communicating with the network 1002. In this way, the tape node 1018 and wireless communications unit 1016 create a hierarchical wireless network of tape nodes for transmitting, forwarding, bridging, relaying, or otherwise communicating wireless messages to, between, or on behalf of the tape node 1018 in a power-efficient and cost-effective way.

In some examples, a mobile gateway 1010 is a mobile phone that is operated by a human operator (e.g., an authorized user 622) and executes a client application 1022 that is configured by a network service to communicate with a designated set of tape nodes, including a secondary or tertiary tape node 1024 that is adhered to a parcel 1026 (e.g., a box), and is further configured to communicate with a server 1004 over the network 1002. In the illustrated example, the parcel 1026 contains a first parcel labeled or sealed by a master tape node 1028 and containing a first asset 1030, and a second parcel labeled or sealed by dummy node ("dummy platform") 1032 and containing a second asset 1034. The secondary or tertiary tape node 1024 communicates with the master tape node 1028 and also communicates with the mobile gateway 1010. In some examples, each of master tape node 1028 includes a lower-power wireless-communications interface of the type used in, e.g., segment 40 (shown in FIG. 3A), and the secondary/tertiary tape node 1024 is implemented by a tape node (e.g., segment 70 or segment 80, shown in FIGS. 4B and 4C) that includes a low-power communications interface for communicating with the master tape node 1028 contained within the parcel 1026, and a higher-power communications interface for communicating with the mobile gateway 1010. The secondary or tertiary tape node 1024 is operable to relay wireless communications between the master tape node 1028 contained within the parcel 1026 and the mobile gateway 1010, and the mobile gateway 1010 is operable to relay wireless communications between the secondary or tertiary tape node 1024 and the server 1004 over the network 1002. In this way, the master tape node 1028 and the secondary or tertiary tape node 1024 create a wireless network of nodes for transmitting, forwarding, relaying, or otherwise communicating wireless messages to, between, or on behalf of the master tape node 1028, the secondary or tertiary tape node 1024, and the network service (not shown) in a power-efficient and cost-effective way. The information transmitted and received from the master tape node 1028 may be of environmental data or tracking data relating to the asset 1034.

In some examples, the stationary gateway 1014 is implemented by a server 1004 executing a network service application 1006 that is configured by the network service 1008 to communicate with a designated set 1040 of master tape nodes 1044, 1046 and dummy nodes 1042, 1048 that are adhered to parcels containing assets 1050, 1052, 1054, 1056 on a pallet 1058. In other examples, the stationary gateway 1014 is implemented by a secondary or tertiary tape node 1060 (e.g., segments 70 or 80, respectively shown in FIGS. 4B and 4C) that is adhered to, for example, a wall, column or other infrastructure component of the physical premise's environment 1000, and includes a low-power communications interface for communicating with nodes within range of the stationary gateway 1014 and a higher-power communications interface for communicating with the network 1002.

In one embodiment, each of the master tape nodes 1044, 1046 is a master tape node and is configured by the network service 1008 to communicate individually with the stationary gateway 1014, which relays communications from the master tape nodes 1044, 1046 to the network service 1008 through the stationary gateway 1014 and over the network 1002. In another embodiment, one of the master tape nodes 1044, 1046 at a time is configured to transmit, forward, relay, or otherwise communicate wireless messages to, between, or on behalf of the other master node on the pallet 1058. In this embodiment, the master tape node may be determined by the master tape nodes 1044, 1046 or designated by the network service 1008. In some examples, the master tape nodes 1044, 1046 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 1059 is adhered to the pallet 1058 and is configured to perform the role of a master node for the other master tape nodes 1042-1048. In these ways, the master tape nodes 1042-1048, 1059 are configurable to create different wireless networks of nodes for transmitting, forwarding, relaying, bridging, or otherwise communicating wireless messages with the network service 1008 through the stationary gateway 1014 and over the network 1002 in a power-efficient and cost-effective way.

In the illustrated example, the stationary gateway 1014 also is configured by the network service 1008 to communicate with a designated network of tape nodes, including the secondary or tertiary tape node 1060 that is adhered to the inside of a door 1062 of a shipping container 1064 (e.g., shipping container 702), and is further configured to communicate with the network service 1008 over the network 1002. In the illustrated example, the shipping container 1064 contains a number of parcels, some of which are labeled or sealed by respective master tape nodes 1066 and containing respective assets, and other of which are sealed with dummy nodes and containing respective assets. In some embodiments, there may be a single master node 1066 collecting environmental and tracking data for each of the assets within the shipping container 1064. The secondary or tertiary tape node 1060 communicates with each of the master tape nodes 1066 within the shipping container 1064 and communicates with the stationary gateway 1014. In some examples, each of the master tape nodes 1066 includes a low-power wireless communications-interface (e.g., the low-power wireless-communication interface 52, with reference to FIG. 4A), and the secondary or tertiary tape node 1060 includes a low-power wireless-communications interface (low-power wireless-communication interfaces 52', 52", with reference to FIGS. 4B-C) for communicating with the master tape nodes 1066 contained within the shipping container 1064, and a higher-power wireless-communications interface (e.g., medium-power wireless-communication interface 72', medium-power wireless-communication interface 72", high-power wireless-communication interface 82", with reference to FIGS. 4B-C) for communicating with the stationary gateway 1014. In some examples, either a secondary or tertiary tape node, or both, may be used, depending on whether a high-power wireless-communication interface is necessary for sufficient communication.

In some examples, when the doors of the shipping container 1064 are closed, the secondary or tertiary tape node 1060 is operable to communicate wirelessly with the master tape nodes 1066 contained within the shipping container 1064. In some embodiments, both a secondary and a tertiary node are attached to the shipping container 1064. Whether a secondary and a tertiary node are used may depend on the range requirements of the wireless-communications interface. For example, if out at sea, a node will be required to transmit and receive signals from a server located outside the range of a medium-power wireless-communications interface, a tertiary node will be used because the tertiary node includes a high-power wireless-communications interface that can communicate at longer ranges than the low or medium wireless-communications interface.

In an example, the secondary or tertiary tape node 1060 is configured to collect sensor data from master tape nodes 1066 and, in some embodiments, process the collected data to generate, for example, statistics from the collected data. When the doors of the shipping container 1064 are open, the secondary or tertiary tape node 1060 is programmed to detect the door opening (e.g., using a photodetector or an accelerometer component of the secondary or tertiary tape node 1060) and, in addition to reporting the door opening event to the network service 1008, the secondary or tertiary tape node 1060 is further programmed to transmit the collected data and/or the processed data in one or more wireless messages to the stationary gateway 1014. The stationary gateway 1014, in turn, is operable to transmit the wireless messages received from the secondary or tertiary tape node 1060 to the network service 1008 over the network 1002. Alternatively, in some examples, the stationary gateway 1014 also is operable to perform operations on the data received from the secondary or tertiary tape node 1060 with the same type of data produced by the secondary or tertiary tape node 1060 based on sensor data collected from the master tape nodes 1046, 1044. In this way, the secondary or tertiary tape node 1060 and master tape node 1066 create a wireless network of nodes for transmitting, forwarding, relaying, or otherwise communicating wireless messages to, between, or on behalf of the master tape node 1066, the secondary or tertiary tape nodes 1060, and the network service 1008 in a power-efficient and cost-effective way.

In an example of the embodiment shown in FIG. 10, there are three types of backward compatible tape nodes: a short-range master tape node (e.g., segment 40), a medium-range secondary tape node (e.g., segment 70), and a long-range tertiary tape node (e.g. segment 80), as respectively shown in FIGS. 4A-4C (here, "tape node" is used interchangeably with "agent" and "platform", as described above). The short-range master tape nodes typically are adhered directly to parcels containing assets. In the illustrated example, the master tape nodes 1018, 1028, 1044, 1046, 1066 are short-range tape nodes. The short-range tape nodes typically communicate with a low-power wireless-communication protocol (e.g., Bluetooth LE, Zigbee, or Z-wave). The segments 70 are typically adhered to objects (e.g., a parcel 1026, a pallet 1058, and a shipping container 1064) that are associated with multiple parcels that are separated from the medium-range tape nodes by a barrier or a long distance. In the illustrated example, the secondary and/or tertiary tape nodes 1024 and 1060 are medium-range tape nodes. The medium-range tape nodes typically communicate with low and medium-power wireless-communication protocols (e.g., Bluetooth, LoRa, or Wi-Fi). The segments 80 typically are adhered to mobile or stationary infrastructure of the network communications environment 1000.

In the illustrated example, the mobile gateway 1012 and the stationary gateway 1014 are implemented by, e.g., segment 80. The segments 80 typically communicate with other nodes using a high-power wireless-communication protocol (e.g., a cellular data communication protocol). In some examples, the wireless communications unit 1016 (a secondary or tertiary tape node) is adhered to a mobile gateway 1012 (e.g., a delivery truck 802). In these examples, the wireless communications unit 1016 may be moved to different locations in the network communications environment 1000 to assist in connecting other tape nodes to the wireless communications unit 1016. In some examples, the stationary gateway 1014 is a tape node that may be attached to a stationary structure (e.g., a wall within a shipping facility) in the network communications environment 1000 with a known geographic location (e.g., GPS coordinates). In these examples, other tape nodes in the environment may determine their geographic location by querying the stationary gateway 1014.

In some examples, in order to conserve power, the tape nodes typically communicate according to a schedule promulgated by the network service 1008. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set, which may be organized according to an originating roll 116 the tape nodes came from. In this example, execution of the GSDL code causes each of the tape nodes (e.g., from a particular roll 116) in the designated set to connect to the master tape node at a different respective time that is specified in the GSDL code, and to communicate a respective set of one or more data packets of one or more specified types of information (e.g., temperature data, vibration data, tracking data, etc.) over the respective connection. In some examples, the master tape node simply forwards the data packets to the server 1004, either directly or indirectly through a gateway tape node (e.g., the long-range tape node, such as wireless communication unit 1016, adhered to the mobile gateway 1012, or a long-range tape node, such as stationary gateway 1014, that is adhered to an infrastructure component of the network communications environment 1000). In other examples, the master tape node processes the information contained in the received data packets and transmits the processed information to the server 1004.

Figure 11:
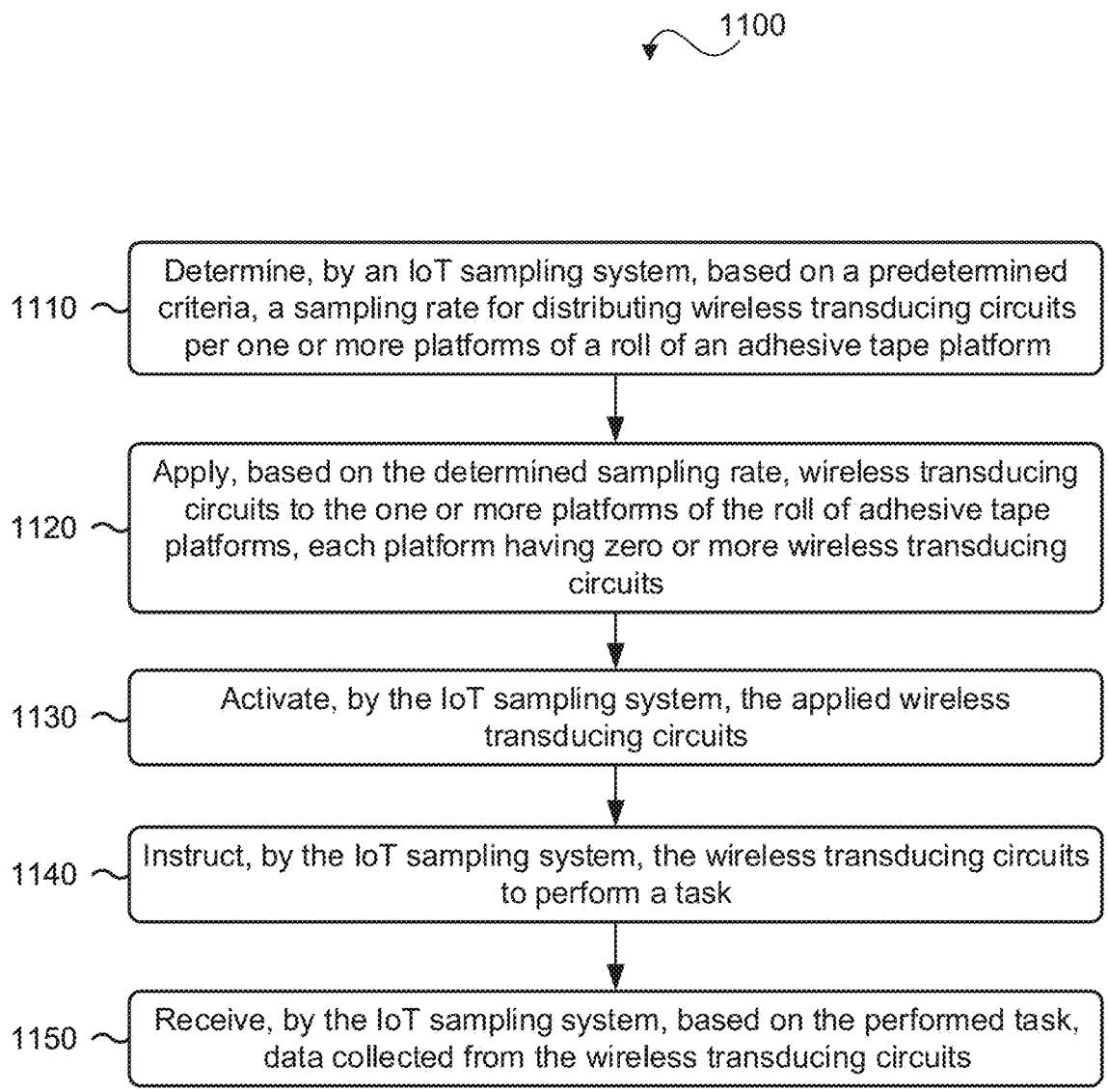
FIG. 11 is a flowchart of an example process associated with an IoT system determining a sampling rate for applying wireless transducing circuits to platforms of a roll of adhesive tape, according to embodiments.

FIG. 11 is a flowchart of an example process 1100 associated with a sampling system (e.g., the computing system 320 or application 1006) determining a sampling rate for applying wireless transducing circuits 10 to a set of platforms 32 of a roll 116 of adhesive tape. In some implementations, one or more process steps of FIG. 11 may be performed by an IoT sampling system. In some implementations, one or more process steps of FIG. 11 may be performed by another device or a group of devices separate from or including the IoT sampling system. Additionally, or alternatively, one or more steps of FIG. 11 may be performed by one or more components of computing system 320, such as processing unit 322, system memory 324, persistent storage memory 328, input component 330, display monitor 332 or 968, and/or display controller 334, application 966, and client device 958.

As shown in FIG. 11, process 1100 may include an IoT sampling system determining (1110) based on a predetermined criteria, a sampling rate for distributing a wireless transducing circuit (e.g., the wireless transducing circuit 10) per one or more platforms of a roll (e.g., the roll 116) of an adhesive tape platform (e.g., any one of platforms 32, 34, 36). For example, the IoT sampling system may determine based on a predetermined criteria, a sampling rate, as described above, with referent to FIG. 5A-D. In some embodiments, the sampling rate may be based on a Nyquist rate. In some embodiments, the roll 116 of platforms 32 may be categorized within a database (e.g., database 1001) and each platform 32 may include an identifier (e.g., the identifier 122) that associates each platform 32 with the category where information pertaining to the roll 116 is stored in the database.

Each wireless transducing circuit may have an antenna, a communications unit, a processor, and a memory. In some embodiments, each wireless transducing circuits 10 within a roll 116 will include the same sensors (e.g., a roll 116 with exclusively temperature sensors, in addition to the antenna, communications unit, processor, and memory). In some embodiments, the sensors within the wireless transducing circuit includes at least one of capacitive sensor, an altimeter, a gyroscope, an accelerometer, a temperature sensor, a strain sensor, a pressure sensor, a piezoelectric sensor, a weight sensor, an optical sensor, an acoustic sensor, a smoke detector, a radioactivity sensor, a chemical sensor, a biosensor, a magnetic sensor, an electromagnetic field sensor, and a humidity sensor.

In some embodiments, the predetermined criteria may include a desired type of data for collection (e.g., temperature data, vibration data, location data, humidity data, etc.), shipping route data (e.g., a travel route; predicted weather at various locations along the route; check points, such as shipping centers; etc.), a confidence threshold for having sensors capable of collected desired data, e.g., a lower confidence level will result in fewer sensors embedded within the wireless transducing circuits. Further, the predetermined criteria may include the value of an asset that the platform 32 is adhesively attached to. For example, the sampling rate may increase for higher valued goods and decrease for lower valued goods. For example, a lower confidence threshold that a sensor is embedded within a platform 32 attached to an asset, and capable of collecting environmental or tracking data of the asset, may be acceptable for inexpensive assets.

The predetermined criteria may further include whether an asset can degrade from environmental conditions, e.g., whether the asset may perish in high temperatures (e.g., flowers, food, etc.) or whether the asset can withstand humidity (e.g., metallic materials), and at what severity of the environmental conditions will degradation occur. For example, a lower confidence threshold may be selected for material that does not degrade from environmental conditions, such as scrap metal; whereas a high confidence level may be selected so that a sensor is embedded within a platform 32 attached to an asset in, e.g., every delivery truck or building for measuring environmental data, when the asset can degrade easily from environmental conditions. The predetermined criteria may further include weather conditions, such as humidity, temperature, etc., or historical data relating to likelihood of theft on a particular physical route. The predetermined criteria is not limited to the aforementioned examples.

In some embodiments, the different sensors embedded within wireless transducing circuits may alternate periodically or randomly. For example, the wireless transducing circuits may be distributed where every third one includes an embedded temperature sensor, every fifth one includes a vibration sensor, every tenth one includes Bluetooth, every twentieth one includes LoRa, etc. Any permutation of distribution the wireless transducing circuits across a roll of adhesive platforms, with different sensors, is contemplated within the scope of this disclosure.

In some embodiments, the one or more determined sampling rates may displayed within a client device (e.g., client device 958, 1010) within the client application (e.g., client application 966, 1022) for selection by an authorized user (e.g., the authorized user). For example, based on the predetermined criteria, the IoT sampling system may determine one or more sampling rates, each with a different cost or confidence level. For example, a first sampling rate may be a least expensive option that has a low confidence level; a second sampling rate may be more expensive than the first sampling rate but with a higher confidence level; and a third sampling rate may be the most expensive but with a guaranteed result of having a wireless transducing circuit 10 in proximity to every package within a shipment, to ensure provide accurate environmental and tracking data.

As further shown in FIG. 11, process 1100 may include applying (1120), based on the determined sampling rate, wireless transducing circuits to the one or more platforms of the roll of adhesive tape platforms, each platform having zero or more wireless transducing circuits. For example, the applying, based on the determined sampling rate, a wireless transducing circuit to the one or more platforms of the roll of adhesive tape platforms, each platform having zero or more wireless transducing circuits, as described above. In some embodiments, application of the wireless transducing circuits may be accomplished as described in FIG. 1.

As further shown in FIG. 11, process 1100 may include activating (1130) the applied wireless transducing circuits. For example, the IoT sampling system may activate the wireless transducing circuits, as described above. In some embodiments, the activating occurs by separating (e.g., by cutting or tearing) the platform 32 that includes a wireless transducing circuit from a roll and adhering the platform to an asset (e.g., a package 110), mobile object (e.g., such as a delivery truck 802), or stationary object (e.g., a structural element of a building within a shipping facility 704). This process activates the platform and causes the platform to communicate with the one or more servers (e.g., server 1004) of a (e.g., network service 1008).

Further, following activation, the wireless transducing circuits 10 may notify a server (e.g., server 1004) that a number of wireless transducing circuits 10 from a particular roll 116 have been activated. The transmission of the notification may depend on the wireless-communication interface capabilities (e.g., low, medium, or high-power wireless-communication interface) within the wireless transducing circuit 10. For example, a wireless transducing circuit 10 with a high-power wireless-communication interface 82" may directly transmit the notification to the server. In some embodiments, activation may occur from an authorized user (e.g., authorized user 622) scanning an identifier (e.g., identifier 122) of the platform 32 using a client application (e.g., client application 966, 1022) within a client device (e.g., client device 958, 1010), and/or an electronic device. The client device may transmit information related to the wireless transducing circuits of the roll, obtained through scanning the identifier, through a network (e.g., network 952, 1002) to the inventory management system (e.g., inventory management system 954) for use by an application (e.g., network service application 962, 1008) and/or for storage, categorized according to the roll 116, within a database (database 1001).

As further shown in FIG. 11, process 1100 may include instructing (1140) the wireless transducing circuits to perform a task. For example, the IoT sampling system may instruct the wireless transducing circuits to perform a task, as described above. In embodiments, the IoT sampling system may instruct the wireless transducing circuit to collect environmental data (e.g., temperature data, vibration data, humidity data, etc.) within a surrounding area. In embodiments, the instruction may be to determine a location, as discussed with reference to FIGS. 9 and 10, of the wireless transducing circuit and then transmit that location. In some embodiments, the wireless transducing circuit may determine that it does not possess the sensor required to complete the instruction, e.g., because the wireless transducing circuit is lacking a temperature sensor. In this case, the wireless transducing circuit may delegate the task to another wireless transducing circuit, to collect the required data upon completion by the other wireless transducing circuit. For example, the wireless transducing circuit may broadcast that it requires a temperature sensor; a nearby wireless transducing circuit may respond that it has the required sensor and can complete the task.

As further shown in FIG. 11, process 1100 may include receiving (1150) data collected from the wireless transducing circuits. For example, the IoT sampling system may receive data collected from the performed task, as described above. Process 1100 may include additional embodiments, such as any single embodiment or any combination of embodiments described below and/or in connection with one or more other processes described elsewhere herein. Although FIG. 10 shows example blocks of process 1100, in some embodiments, process 1100 may include additional steps, fewer steps, different steps, or differently arranged steps than those depicted in FIG. 11. Additionally, or alternatively, two or more of the steps of process 1100 may be performed in parallel.

Figure 12:
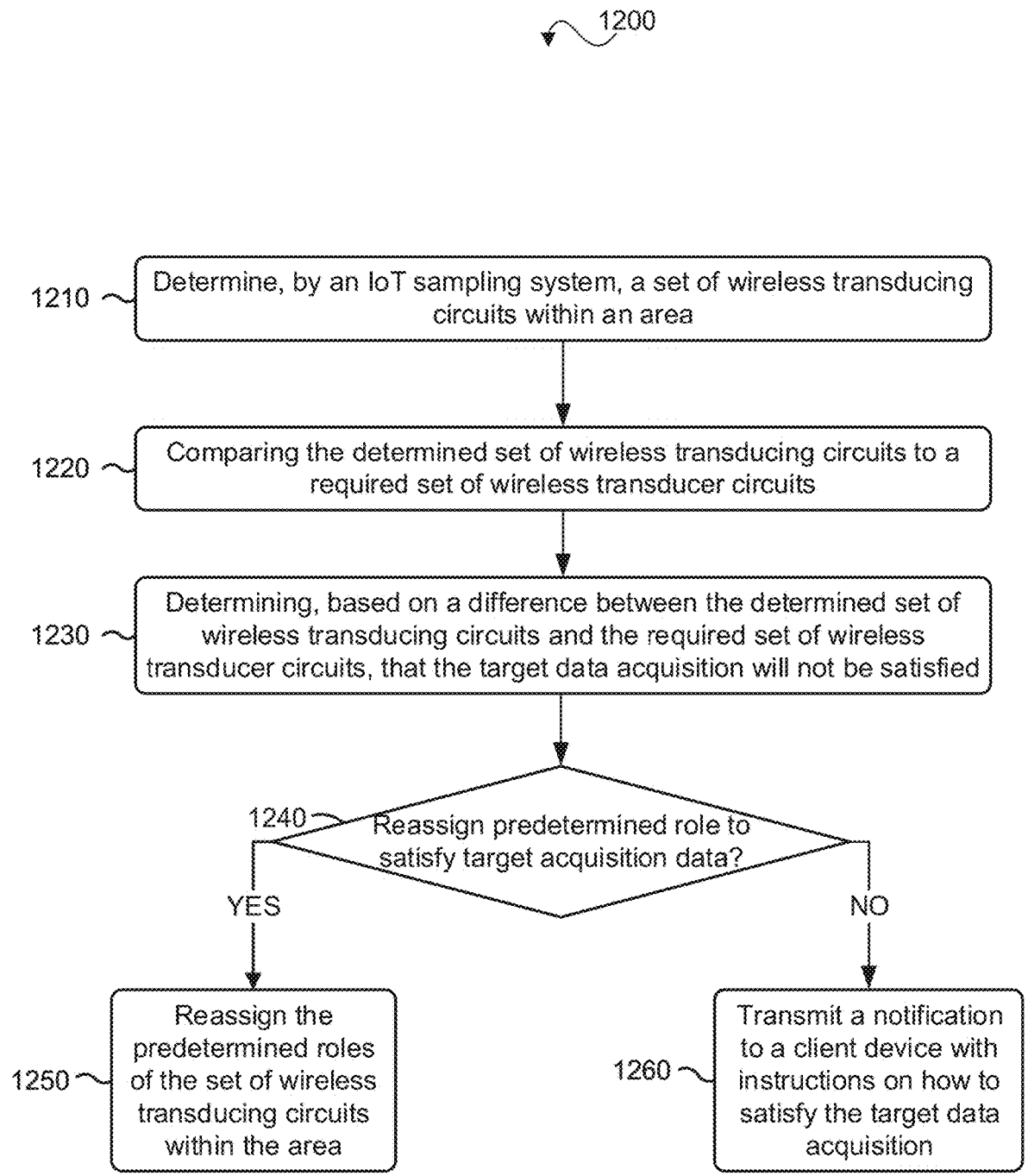
FIG. 12 is a flowchart of an example process associated with an IoT system determining whether to reassign predetermined roles of wireless transducing circuits to satisfy a target data acquisition, according to embodiments.

FIG. 12 is a flowchart of an example process 1200 associated with a sampling system (e.g., the computing system 320 or application 1006) determining whether to reassign predetermined roles of the wireless transducing circuits based on not satisfying a target data acquisition. In some implementations, one or more process steps of FIG. 12 may be performed by an IoT sampling system. Further, the one or more process steps of FIG. 12 may be performed may be performed at any point in a shipping route, from the point of leaving a shipping facility, immediately after a platform 32 is applied to a parcel, to at the time of arriving at a final destination, and any time in between, e.g., at, before, or after leaving checkpoints, etc. In some implementations, one or more process steps of FIG. 12 may be performed by another device or a group of devices separate from or including the IoT sampling system. Additionally, or alternatively, one or more steps of FIG. 12 may be performed by one or more components of computing system 320, such as processing unit 322, system memory 324, persistent storage memory 328, input component 330, display monitor 332 or 968, and/or display controller 334, application 966, and client device 958, 1022.

As shown in FIG. 12, process 1200 may include an IoT sampling system identifying (1210) a set of wireless transducing circuits (e.g., wireless transducing circuits 10) within an area (e.g., a manufacturing warehouse, a shipping center 704, or a trailer 804 of a delivery truck 802). In embodiments, the IoT sampling system may designate a wireless transducing circuit, that includes a high-power wireless-communication interface capable of communicating with a satellite (e.g., satellite 960, 1070) or network (e.g., network 952, 1002), to identify the wireless transducing circuits within the area and their associated types of wireless-communication interfaces (low, medium, or high-power wireless-communication sensors, with reference to FIG. 4A-C) and sensors (e.g., temperature sensor, vibration sensor, etc.). In some embodiments, the designated wireless transducing circuit may transmit compiled data associated with the identified wireless transducing circuits to the satellite or network (e.g., network 952, 1002).

As shown in FIG. 12, process 1200 may include the IoT sampling system comparing (1220) the identified set of wireless transducing circuits within the area to a required set of wireless transducing circuits. In some embodiments, the required set of wireless transducing set may be the required number of wireless transducing circuits with particular sensors and/or types of wireless-communication interfaces to obtain a desired amount of environmental data and/or tracking data, which may be based on the predetermined criteria, as described above. For example, if the assets being delivered are sensitive to temperature, having at least one wireless transducing circuit, with an embedded temperature sensor and communication capabilities to transmit the collected temperature data within the area, is required to determine the temperature of the surrounding environment of the asset. Likewise, if the asset is extremely valuable, such as jewelry, having a wireless transducing circuit capable of transmitting precise location data or precise vibration data is required.

In some embodiments, the IoT sampling system determines a sampling frequency (e.g., density or ratio) of the identified set of wireless transducing circuits that include particular sensors and/or types of wireless-communication interfaces. For example, the IoT sampling system may determine the ratio (e.g., 1:4, 2:5, etc.) of identified wireless transducing circuits that include a temperature sensor, a vibration sensor, etc. to the total amount of identified wireless transducing circuits. Further, the determined ratio may include the total amount of dummy platforms to platforms that include a wireless transducing circuit, or the total amount of activated wireless transducing circuits to the total amount of deactivated wireless transducing circuits. Each determined ratio may be compared to a corresponding predetermined acceptable ratio. For example, the ratio of wireless transducing circuits that include a temperature to wireless transducing circuits without the temperature sensor may be compared to a predetermined ratio of wireless transducing circuits that include a temperature to wireless transducing circuits without the temperature sensor.

As shown in FIG. 12, process 1200 may include the IoT sampling system determining (1230), based on a difference between the identified set of wireless transducing circuits and the required set of wireless transducer circuits, that the target data acquisition will not be satisfied. For example, the difference may be, with reference to the above example, that the required set of wireless transducing circuits includes a temperature sensor embedded within at least one wireless transducing circuit, and the identified set of wireless transducing circuits does not include an embedded temperature sensor. In the embodiment of the IoT sampling system comparing the determined ratio to a predetermined ratio, the IoT sampling system may determine the difference (a difference resulting the determined ratio being higher or lower than the predetermined ratio) between the determined ratio to a predetermined ratio.

As shown in FIG. 12, process 1200 may include an IoT sampling system determining (1240) whether reassigning the predetermined roles of the set of wireless transducing circuits within the area would be sufficient to achieve the target data acquisition. For example, in the above example with the temperature sensor, it may not be possible to reassign any of the wireless transducing circuits to collect temperature because there are no temperature sensors embedding within any of the wireless transducing circuits. However, if location data is desired, and a wireless transducing circuit that includes a medium or high-power wireless-communication interface, which is required for transmitting the location data to the network, for example, is missing, then another wireless transducing circuit with a medium or high-power wireless-communication interface may replace the missing one. Likewise, if a temperature sensor is required and a wireless transducing circuit, with a temperature sensor and a predetermined role to collect temperature data, is missing, another wireless transducing circuit that includes a temperature sensor may be assigned a new role to collect temperature data. In some embodiments, the IoT sampling system may inquire whether stationary (e.g., stationary gateway 1014) or mobile gateways (e.g., mobile gateways 1010, 1012), e.g., depending on whether the assets are within a trailer or at a shipping center (with reference to FIG. 10), can perform the predetermined role, in place of the wireless transducing circuit.

As shown in FIG. 12, if the output of the inquiry for step (1240) is "yes", the process 1200 may proceed with the IoT sampling system reassigning (1250) the predetermined roles of the wireless transducing circuits within the area, or of any mobile and/or stationary gateways. For example, the IoT sampling system may designate a new wireless transducing circuit to collect temperature data. In some embodiments, the IoT sampling system may determine that platforms 32 stationed at a warehouse (e.g., as described above) may be leveraged such that the IoT sampling system reassigns the stationary platform's predetermined roles to perform the role of the required wireless transducing circuit, if the platform includes the required type of sensor or wireless communications interface to perform the role. In some embodiments, if a confidence threshold is low and temperature collection is not necessary, or battery levels of nearby wireless transducing circuits that include the required type of sensor is low, the IoT sampling system may reference shipping route data to determine upcoming checkpoints, and delay reassigning role of the nearby wireless transducing circuits near the asset, and assign the role to the stationary platform that includes a wireless transducing circuit (e.g., that may have a permanent battery source) located at a checkpoint.

However, if the output of the inquiry for step (1240) is "no", the process 1200 may proceed with the IoT sampling system transmitting (1260) a notification to a client device (e.g., client device 958, 1010) with instructions for display (e.g., display 968) on how to satisfy the target data acquisition; the instructions are accessible within the client application (e.g., client application 966, 1022). For example, the IoT sampling system may transmit instructions to a client device of an authorized user (e.g., driver of delivery truck 802) to peel off a platform (e.g., platform 32) from a roll (e.g., roll 116) that includes a required wireless transducing circuit, e.g., with an embedded temperature, and apply the platform to a particular asset within the trailer (e.g., trailer 804). In some embodiments, the IoT sampling system may determine a severity of not having the required wireless transducing circuit and include, within the notification, the determined severity.

In some embodiments where the IoT sampling system determines a ratio that does not satisfy a predetermined ratio, the instruction may be for the authorized user to apply new platforms from the roll that include wireless transducing circuits to parcels, in an amount that brings the determined ratio closer to the predetermined ratio. In some embodiments, the instructions may indicate which particular parcels to add the platforms to.

In some embodiments, the instructions may be for the authorized user to replace the current platforms on one or more parcels with one or more platforms from a roll (e.g., a new roll) that has a higher frequency/density of a particular type of sensor and/or wireless transducing circuit than was originally applied.

In an embodiment where step 1230 results in the determined ratio being higher than the predetermined ratio (i.e., the sampling ratio of a particular sensor or wireless transducing circuit is higher than is needed), the instructions may be to remove platforms from the assets. For example, if the determined ratio of wireless transducing circuits with embedded temperature sensors to wireless transducing circuits without embedded temperature sensors is 1:4 and the predetermined ratio is 1:5, then there is more wireless transducing circuits with embedded temperature sensors than is necessary to collect temperature data. The instruction may be to remove a number of wireless transducing circuits from assets such that the predetermined ratio is approximately or equal to the predetermined ratio. In this embodiments, the platforms may be reclaimed and recycled/reused or refurbished. Additionally, in some embodiments, all platforms may be reclaimed and recycled/reused or refurbished.

In the embodiments of the platforms being removed, replaced or switched with platforms on other assets, or added to assets that do not include a platform, the IoT sampling system may be updated to reflect the change in the field so that the association between the platform (e.g., the hardware identifier) and the asset (e.g., tracking barcode) are up-to-date in the IoT sampling system. For example, the IoT sampling system may update its tracking system of every platform included or associated with an instruction to reflect the proposed instructions automatically or the IoT sampling system may receive an input from the authorized user that includes any changes the authorized user made to the platforms according to the instruction. For example, the IoT sampling system may automatically update the status of platforms to reflect any outputted instructions and then receive a confirmation from the authorized user that the instructions were carried out fully, or the authorized user may indicate which portions of the instructions were not followed.

In some embodiments, the platforms are color-coded, as described above, for quick identification and differentiation between dummy platforms and platforms that include particular sensors or wireless-communication interfaces. For example, the dummy platforms is be colored white, while a platform that includes a wireless transducing circuit, with an embedded temperature sensor, is be colored red. In this embodiment, the transmitted notification may include, rather than which sensor is required to apply to a particular asset, the color of the platform for the authorized user to apply to the asset.

In some embodiments, the IoT system may determine that the set of wireless transducing circuits matches the required set of wireless transducing circuits; however, the frequency of collecting temperature data (e.g., every two hours) is insufficient to determine an accurate temperature within a delivery truck, e.g., traveling through a desert with assets that are sensitive to temperature or location data is not accurate enough to determine the location of the delivery truck to within a thousand meters. In this embodiment, the IoT sampling system can reassign the predetermined roles of the wireless transducing circuits, with embedded temperature sensors, to increase the frequency of temperature data collection.

Exemplary Computer Apparatus

Figure 13:
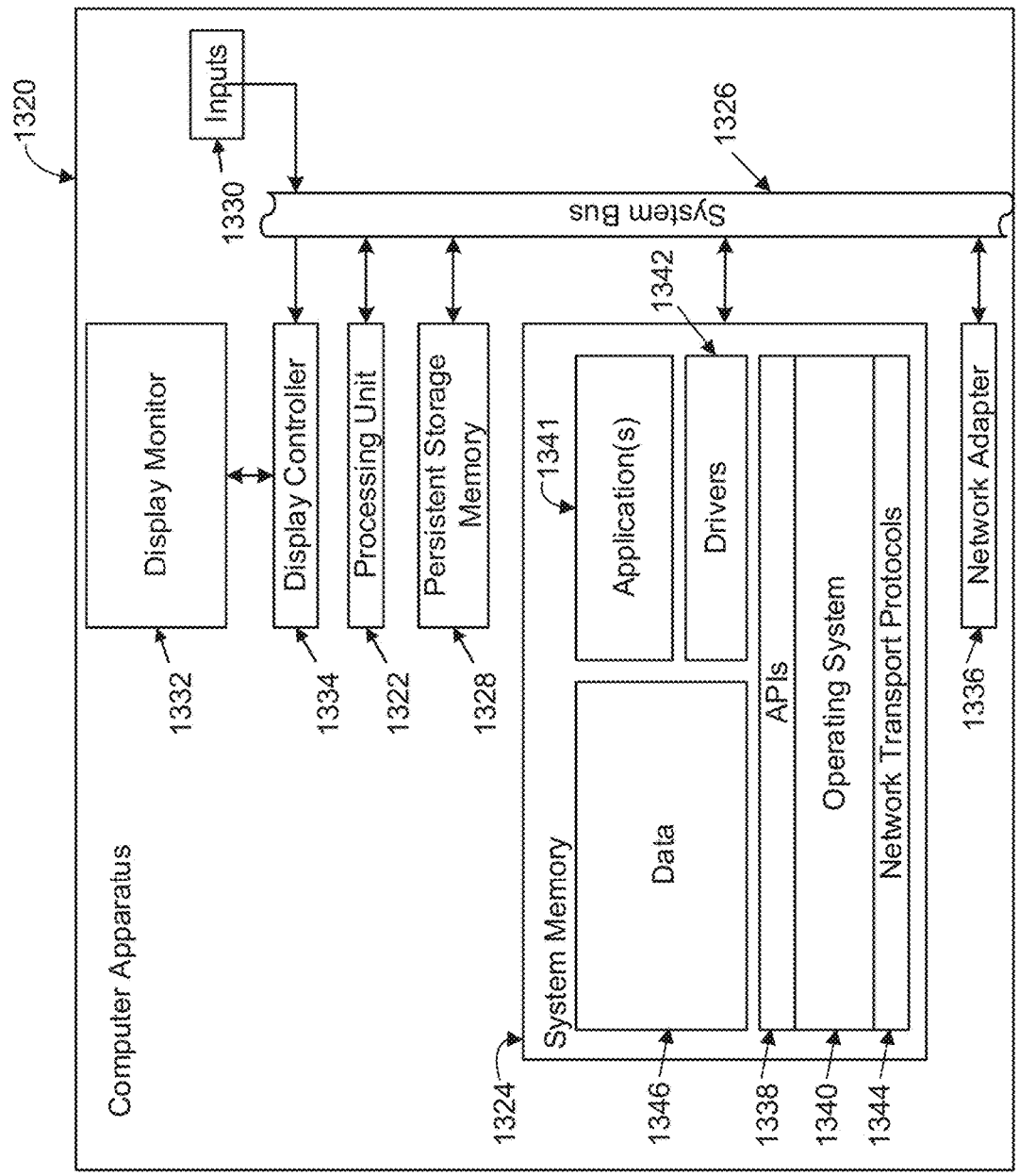
FIG. 13 is a block diagram of an example computer apparatus, according to an embodiment.

FIG. 13 shows an example embodiment of computer apparatus 1320 that, either alone or in combination with one or more other computing apparatus, is operable to implement one or more of the computer systems described in this specification.

The computer apparatus 1320 includes a processing unit 1322, a system memory 1324, and a system bus 1326 that couples the processing unit 1322 to the various components of the computer apparatus 1320. The processing unit 1322 may include one or more data processors, each of which may be in the form of any one of various commercially available computer processors. The system memory 1324 includes one or more computer-readable media that typically are associated with a software application addressing space that defines the addresses that are available to software applications. The system memory 1324 may include a read only memory (ROM) that stores a basic input/output system (BIOS) that contains start-up routines for the computer apparatus 1320, and a random-access memory (RAM). The system bus 1326 may be a memory bus, a peripheral bus, or a local bus, and may be compatible with any of a variety of bus protocols, including PCI, VESA, Microchannel, ISA, and EISA. The computer apparatus 1320 also includes a persistent storage memory 1328 (e.g., a hard drive, a floppy drive, a CD ROM drive, magnetic tape drives, flash memory devices, and digital video disks) that is connected to the system bus 1326 and contains one or more computer-readable media disks that provide non-volatile or persistent storage for data, data structures and computer-executable instructions.

A user may interact (e.g., input commands or data) with the computer apparatus 1320 using one or more input devices 1330 (e.g. one or more keyboards, computer mice, microphones, cameras, joysticks, physical motion sensors, and touch pads). Information may be presented through a graphical user interface (GUI) that is presented to the user on a display monitor 1332, which is controlled by a display controller 1334. The computer apparatus 1320 also may include other input/output hardware (e.g., peripheral output devices, such as speakers and a printer). The computer apparatus 1320 connects to other network nodes through a network adapter 1336 (also referred to as a "network interface card" or NIC).

A number of program modules may be stored in the system memory 1324, including application programming interfaces 1338 (APIs), an operating system (OS) 1340 (e.g., the Windows® operating system available from Microsoft Corporation of Redmond, Washington U.S.A.), software applications 1341 including one or more software applications programming the computer apparatus 1320 to perform one or more of the steps, tasks, operations, or processes of the positioning and/or tracking systems described herein, drivers 1342 (e.g., a GUI driver), network transport protocols 1344, and data 1346 (e.g., input data, output data, program data, a registry, and configuration settings).

Examples of the subject matter described herein, including the disclosed systems, methods, processes, functional operations, and logic flows, may be implemented in data processing apparatus (e.g., computer hardware and digital electronic circuitry) operable to perform functions by operating on input and generating output. Examples of the subject matter described herein also may be tangibly embodied in software or firmware, as one or more sets of computer instructions encoded on one or more tangible non-transitory carrier media (e.g., a machine-readable storage device, substrate, or sequential access memory device) for execution by data processing apparatus.

The details of specific implementations described herein may be specific to particular embodiments of particular disclosures and should not be construed as limitations on the scope of any claimed disclosure. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An IoT sampling system, comprising:
   a set of adhesive tape platforms, each adhesive tape platform having zero or more wireless transducing circuits applied according to a sampling frequency that is based on a predetermined criteria, each applied wireless transducing circuit further having a predetermined role and one or more features based on the predetermined criteria, the sampling frequency defining a ratio of the zero or more wireless transducing circuits that include a sensor and/or type of wireless-communication interface.

2. The IOT sampling system of claim 1, wherein the set of adhesive tape platforms are disposed in a form of a dispensable roll of adhesive tape platforms, in a form of a sheet of adhesive tape platforms that includes cutouts defining a perimeter of each of the adhesive tape platforms, or is in a form of a continuous strip of adhesive tape platforms, each adhesive tape platform included in a segment of the strip.

3. The IoT sampling system of claim 1, wherein at least one of the adhesive tape platforms of the set of adhesive tape platforms includes a wireless transducing circuit that includes a wireless-communication interface communicatively coupled with a remote server or nearby wireless transducing circuits.

4. The IoT sampling system of claim 1, wherein the predetermined criteria includes an environmental data type, shipping route, and confidence level of satisfying a target data acquisition.

5. The IoT sampling system of claim 1, wherein the features includes at least a wireless-communication interface and zero or more sensors embedded within the wireless transducing circuits.

6. The IoT sampling system of claim 1, wherein the wireless transducing circuits are configured to reassign their predetermined roles based on a target data acquisition.

7. The IoT sampling system of claim 1, wherein the predetermined role is for a first wireless-communication interface of a first wireless transducing circuit, operable to communicate with a second wireless-communication interface of a second wireless transducing circuit, to transmit data, from the first wireless-communication interface, to the second wireless-communication interface.

8. The IoT sampling system of claim 7, wherein the first wireless-communication interface is operable to identify the second wireless-communication interface, determine battery levels of the first wireless transducing circuit and the second wireless transducing circuit, and given the battery level of the second wireless transducing circuit satisfying a threshold, the first wireless transducing circuit delegating communication responsibilities to the second wireless transducing circuit, and the first wireless transducing circuit powers down.

9. The IoT sampling system of claim 7, wherein the first wireless transducing circuit is operable to delegate the predetermined role of the first wireless transducing circuit to the second wireless transducing circuit.

10. The IoT sampling system of claim 9, wherein the second wireless transducing circuit is operable to obtain sensor data collected within a surrounding environment of the second wireless transducing circuit and communicate the sensor data to the first wireless transducing circuit.

11. The IoT sampling system of claim 1, wherein the predetermined role is to transmit sensor data to a remote server, the sensor data is collected from at least one sensor embedded within the wireless transducing circuit.

12. The IoT sampling system of claim 11, wherein the one or more sensors embedded within the wireless transducing circuit includes at least one of a capacitive sensor, an altimeter, a gyroscope, an accelerometer, a temperature sensor, a strain sensor, a pressure sensor, a piezoelectric sensor, a weight sensor, an optical sensor, an acoustic sensor, a smoke detector, a radioactivity sensor, a chemical sensor, a biosensor, a magnetic sensor, an electromagnetic field sensor, and a humidity sensor.

13. A method, comprising:
   determining, by an IoT sampling system, based on a predetermined criteria, a sampling rate for distributing wireless transducing circuits per one or more platforms of a set of adhesive tape platforms;
   applying, based on the determined sampling rate, the wireless transducing circuits to the one or more platforms, each platform having zero or more wireless transducing circuits;
   activating, by the IoT sampling system, the applied wireless transducing circuits;
   instructing, by the IoT sampling system, the wireless transducing circuits to perform a predetermined role; and
   receiving, by the IoT sampling system, data collected from the wireless transducing circuits.

14. The method of claim 13, comprising:
   determining, by the wireless transducing circuit, that a first wireless transducing circuit does not have a required component to complete a first predetermined role;
   broadcasting, by the first wireless transducing circuit, to a second wireless transducing circuit that includes the required component to complete the predetermined role,
   delegating, by the first wireless transducing circuit, the predetermined role to the second wireless transducing circuit.

15. The method of claim 14, further comprising:
   receiving, by the first wireless transducing circuit, from the second wireless transducing circuit, a desired type of data collected according to the predetermined role.

16. The method of claim 13, wherein the sampling rate is according to a Nyquist rate.

17. The method of claim 13, wherein the determining the sampling rate includes determining one or more sampling rates, the method further comprising:
- displaying, within a client device, the one or more sampling rates; and
- receiving, from the client device, a selection of one of the one or more sampling rates.

18. The method of claim 13, wherein the predetermined role is to collect sensor data from one or more sensors within the wireless transducing circuit at the one or more points in time, from a surrounding environment of the wireless transducing circuit.

19. The method of claim 18, wherein the one or more sensors within the wireless transducing circuit includes at least one of capacitive sensor, an altimeter, a gyroscope, an accelerometer, a temperature sensor, a strain sensor, a pressure sensor, a piezoelectric sensor, a weight sensor, an optical sensor, an acoustic sensor, a smoke detector, a radioactivity sensor, a chemical sensor, a biosensor, a magnetic sensor, an electromagnetic field sensor, and a humidity sensor.

20. The method of claim 13, wherein the sampling rate further includes a distribution of zero or more electrical components embedded within the applied wireless transducing circuits.

21. The method of claim 13, wherein the instructed predetermined role is based on a target data acquisition that includes location and environmental data collection, the method further comprising:
- identifying, by the IoT sampling system, a set of wireless transducing circuits within an area;
- comparing, by the IoT sampling system, the identified set of wireless transducing circuits within the area to a required set of wireless transducing circuits;
- determining, by the IoT sampling system, based on the comparing, the target data acquisition will not be satisfied; and
- responsive to determining that the target data acquisition will not be satisfied, either (i) reassigning, by the IoT sampling system, the predetermined roles of the identified wireless transducing circuits or (ii) transmitting, by the IoT sampling system, a notification, to display within a client device, that includes instructions for achieving the target data acquisition.

22. A non-transitory computer readable storage medium, storing a computer instruction, wherein the computer instruction, when executed by a computer, causes the computer to perform operations, comprising:
- determining, by an IoT sampling system, based on a predetermined criteria, a sampling rate for distributing wireless transducing circuits per one or more platforms of a set of adhesive tape platforms;
- applying, based on the determined sampling rate, the wireless transducing circuits to one or more platforms of the set of adhesive tape platforms, each platform having zero or more wireless transducing circuits;
- activating, by the IoT sampling system, the applied wireless transducing circuits;
- instructing, by the IoT sampling system, the wireless transducing circuits to perform a predetermined role; and
- receiving, by the IoT sampling system, data collected from the wireless transducing circuits.

23. The non-transitory computer readable storage medium of claim 22, further comprising computer instruction that, when executed by the computer, causes the computer to perform operations including:
- determining, by the IoT sampling system, that a first wireless transducing circuit does not have a required component to complete a first predetermined role;
- broadcasting, by the first wireless transducing circuit, to a second wireless transducing circuit that includes the required component to complete the predetermined role,
- delegating, by the first wireless transducing circuit, the predetermined role to the second wireless transducing circuit.

24. The non-transitory computer readable storage medium of claim 22, further comprising:
- receiving, by the wireless transducing circuit, from the other wireless transducing circuit, the data collected.

25. The non-transitory computer readable storage medium of claim 22, wherein the instructed predetermined role is based on a target data acquisition that includes location and environmental data collection, the method further comprising computer instruction that, when executed by the computer, causes the computer to perform operations including:
- identifying, by the IoT sampling system, a set of wireless transducing circuits within an area;
- comparing, by the IoT sampling system, the identified set of wireless transducing circuits within the area to a required set of wireless transducing circuits;
- determining, by the IoT sampling system, based on the comparing, the target data acquisition will not be satisfied; and
- responsive to determining that the target data acquisition will not be satisfied, either (i) reassigning, by the IoT sampling system, the predetermined roles of the identified wireless transducing circuits or (ii) transmitting, by the IoT sampling system, a notification, to display within a client device, that includes instructions for achieving the target data acquisition.

* * * * *